US010253996B2

United States Patent
Uno et al.

(10) Patent No.: US 10,253,996 B2
(45) Date of Patent: Apr. 9, 2019

(54) AIR-CONDITIONING SYSTEM CONTROL DEVICE AND AIR-CONDITIONING SYSTEM CONTROL METHOD

(71) Applicant: Mitsubishi Electric Corporation, Chiyoda-ku (JP)

(72) Inventors: Yoshitaka Uno, Chiyoda-ku (JP); Takaya Yamamoto, Chiyoda-ku (JP); Mio Motodani, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 247 days.

(21) Appl. No.: 14/890,288

(22) PCT Filed: Jun. 17, 2013

(86) PCT No.: PCT/JP2013/066612
§ 371 (c)(1),
(2) Date: Nov. 10, 2015

(87) PCT Pub. No.: WO2014/203311
PCT Pub. Date: Dec. 24, 2014

(65) Prior Publication Data
US 2016/0109147 A1    Apr. 21, 2016

(51) Int. Cl.
*F24F 11/30* (2018.01)
*G05B 15/02* (2006.01)
(Continued)

(52) U.S. Cl.
CPC .............. *F24F 11/30* (2018.01); *F24F 11/62* (2018.01); *F24F 11/70* (2018.01); *G05B 15/02* (2013.01);
(Continued)

(58) Field of Classification Search
CPC .............. F24F 2011/0026; F24F 11/006; F24F 11/0012; F24F 11/0015; F24F 11/0076; F24F 11/085; G05B 15/02
(Continued)

(56) References Cited

U.S. PATENT DOCUMENTS

2003/0010047 A1    1/2003   Shimoda
2005/0194125 A1*   9/2005   Asai .................. B60H 1/00864
                                                             165/202
(Continued)

FOREIGN PATENT DOCUMENTS

JP       03-217746 A      9/1991
JP       10-197026 A      7/1998
(Continued)

OTHER PUBLICATIONS

Mio Mototani, Air Conditioning System Control Device, Oct. 24, 2007, English Machine Translation of Japanese Patent Publication JP 2011214794 (A).*

(Continued)

*Primary Examiner* — Robert E Fennema
*Assistant Examiner* — Christopher W Carter
(74) *Attorney, Agent, or Firm* — Oblon, McClelland, Maier & Neustadt, L.L.P.

(57) ABSTRACT

An air-conditioning system controller controls one or plural air-conditioning apparatus installed in a building, and includes a processor that determines an air-conditioning apparatus control command so that a preset evaluation index satisfies a preset condition in a preset control-target period under a preset constraint. The processor divides the control-target period into time sections, determines a room-temperature change permissible range within which a room temperature satisfies the constraint, determines a heat-load change permissible range, based on the room temperature, (Continued)

the room-temperature change permissible range, a heat load estimation, and a heat load to be processed by each air-conditioning apparatus, and determines, for each time section, as the air-conditioning apparatus control command, an operation frequency and start-stop of the air-conditioning apparatus, based on the heat-load change permissible range and an operation efficiency of the air-conditioning apparatus.

9 Claims, 15 Drawing Sheets

(51) Int. Cl.
| | |
|---|---|
| F24F 11/62 | (2018.01) |
| F24F 11/70 | (2018.01) |
| F24F 110/10 | (2018.01) |
| F24F 110/20 | (2018.01) |
| F24F 110/70 | (2018.01) |
| F24F 140/50 | (2018.01) |
| F24F 140/60 | (2018.01) |
| F24F 120/20 | (2018.01) |
| F24F 11/63 | (2018.01) |
| F24F 11/64 | (2018.01) |
| F24F 11/56 | (2018.01) |
| F24F 11/58 | (2018.01) |
| F24F 11/61 | (2018.01) |
| F24F 11/46 | (2018.01) |

(52) U.S. Cl.
CPC .............. *F24F 11/46* (2018.01); *F24F 11/56* (2018.01); *F24F 11/58* (2018.01); *F24F 11/61* (2018.01); *F24F 11/63* (2018.01); *F24F 11/64* (2018.01); *F24F 2110/10* (2018.01); *F24F 2110/20* (2018.01); *F24F 2110/70* (2018.01); *F24F 2120/20* (2018.01); *F24F 2140/50* (2018.01); *F24F 2140/60* (2018.01)

(58) Field of Classification Search
USPC ........................................................ 700/276
See application file for complete search history.

(56) References Cited

U.S. PATENT DOCUMENTS

| | | | |
|---|---|---|---|
| 2012/0083927 | A1 | 4/2012 | Nakamura et al. |
| 2014/0277761 | A1* | 9/2014 | Matsuoka .............. F24F 11/006 |
| | | | 700/276 |

FOREIGN PATENT DOCUMENTS

| | | |
|---|---|---|
| JP | 2002-071187 | 3/2002 |
| JP | 2002-147823 A | 5/2002 |
| JP | 2003-139372 A | 5/2003 |
| JP | 2008-045810 A | 2/2008 |
| JP | 2011-214794 | 10/2011 |
| JP | 2012-154563 A | 8/2012 |
| JP | 50299913 B2 | 9/2012 |

OTHER PUBLICATIONS

Combined Chinese Office Action and Search Report dated Jun. 20, 2017 in Patent Application No. 201380077497.0 (with English Translation and English Translation of Category of Cited Documents).

International Search Report dated Sep. 17, 2013, in PCT/JP13/66612 Filed Jun. 17, 2013.

Extended European Search Report dated Jan. 30, 2017 in Patent Application No. 13887078.7.

Office Action dated Jul. 10, 2018, in European Patent Application No. 13 887 078.7.

* cited by examiner

AIR-CONDITIONING SYSTEM CONTROL DEVICE AND AIR-CONDITIONING SYSTEM CONTROL METHOD

TECHNICAL FIELD

The present invention relates to an air-conditioning system control device and an air-conditioning system control method.

BACKGROUND ART

Central air-conditioning systems are adopted generally in buildings of medium size or larger. In central air-conditioning systems, cold water or hot water is prepared at one location, and the prepared cold water or hot water is circulated to each room in a building.

However, individual distribution package air-conditioning systems, that is, multi-air-conditioning systems for buildings are increasingly adopted these days, in view of the fact that they are inexpensive, easily installed, and easily used by occupants. In multi-air-conditioning systems for buildings, indoor units are provided in respective air-conditioning zones that are allocated as air-conditioned spaces, and the plurality of the indoor units are connected to one outdoor unit. In this way, the multi-air-conditioning systems for buildings provide individual distribution package air-conditioning systems. For example, as a multi-air-conditioning system for buildings, Patent Literature 1 discloses a technique of providing an exact required capacity depending on a calculated heat load.

Air-conditioning system control devices that control air-conditioning systems are generally desired to increase the operation efficiencies of air-conditioning apparatus for the purpose of energy-saving operation. For example, as a central air-conditioning system that increases the operation efficiencies of air-conditioning apparatus, Patent Literature 2 discloses, on the assumption that a plurality of heat source apparatus are present, a technique of creating optimum operation patterns of the plurality of heat source apparatus depending on a heat load by preparing performance characteristics of the respective heat source apparatus. In addition, for example, as an air-conditioning system that increases the operation efficiencies of air-conditioning apparatus, Patent Literature 3 discloses a technique of stopping an air-conditioning apparatus in the case where a heat load that decreases the operation efficiency of the air-conditioning apparatus is present.

CITATION LIST

Patent Literature

Patent Literature 1: Japanese Unexamined Patent Application Publication No. 03-217746 (claim 1)
Patent Literature 2: Japanese Unexamined Patent Application Publication No. 2012-154563 (claim 1)
Patent Literature 3: Japanese Patent No. 5029913 (claim 1)

SUMMARY OF INVENTION

Technical Problem

Because air-conditioning system control devices of the related art such as the one disclosed in Patent Literature 1 provide an exact required capacity to an air-conditioned space depending on a heat load, the room temperature is maintained constant. Improvement in the operation efficiencies of air-conditioning apparatus, however, is not taken into account. Thus, the air-conditioning system control devices of the related art such as the one disclosed in Patent Literature 1 are incapable of increasing the operation efficiencies of air-conditioning apparatus.

In contrast, air-conditioning system control devices of the related art such as the one disclosed in Patent Literature 2 are capable of creating operation patterns in which the improvement in the operation efficiencies of air-conditioning apparatus is taken into account. However, because a heat load is a given value, the air-conditioning system control devices of the related art such as the one disclosed in Patent Literature 2 are incapable of adjusting the heat load. Consequently, depending on the heat load, the air-conditioning system control devices of the related art such as the one disclosed in Patent Literature 2 fail to increase the operation efficiencies of air-conditioning apparatus when the air-conditioning apparatus are in operation.

In addition, air-conditioning system control devices of the related art such as the one disclosed in Patent Literature 3 control various devices by taking the improvement in the operation efficiencies of air-conditioning apparatus into account and stop an air-conditioning apparatus depending on a predetermined condition. Consequently, a frequent change in the room temperature is caused. Thus, the air-conditioning system control devices of the related art such as the one disclosed in Patent Literature 3 fail to control the change in the room temperature within a predetermined range.

As described above, the air-conditioning system control devices of the related art such as the ones disclosed in Patent Literatures 1 to 3 have a problem in that they fail to increase the operation efficiencies of air-conditioning apparatus while controlling a change in the room temperature within a predetermined range when the air-conditioning apparatus are in operation.

The present invention has been made to solve the aforementioned problem and aims to provide an air-conditioning system control device and an air-conditioning system control method that successfully increase the operation efficiencies of air-conditioning apparatus while controlling a change in the room temperature within a predetermined range when the air-conditioning apparatus are in operation.

Solution to Problem

An air-conditioning system control device according to the present invention is configured to control one or a plurality of air-conditioning apparatus installed in a building, and includes an air-conditioning apparatus data obtaining unit configured to obtain operation data of the one or plurality of air-conditioning apparatus, a heat load estimation obtaining unit configured to obtain a heat load estimation for the building, and an air-conditioning apparatus control command determining unit configured to determine an air-conditioning apparatus control command so that a preset evaluation index satisfies a preset condition in a preset control-target period under a preset constraint. The air-conditioning apparatus control command determining unit is configured to include time sections set therein, to divide the control-target period into a plurality of time periods by one or a plurality of preset division intervals. The air-conditioning apparatus control command determining unit is further configured to determine a room-temperature change permissible range. A room temperature included in the operation data satisfies the constraint within the room-temperature change permissible range. The air-conditioning apparatus control command determining unit is still further configured to determine a heat-load change permissible range, based on the room temperature included in the operation data, the room-temperature change permissible range, the heat load estimation, and a heat load to be processed by the one air-conditioning apparatus or a heat load to be processed by each of the plurality of air-conditioning apparatus, and is configured to determine, for each of the plurality of time sections, as the air-conditioning apparatus control command, an operation frequency and start-stop of the one or plurality of air-conditioning apparatus, based on the heat-load change permissible range and an operation efficiency of the one air-conditioning apparatus or an operation efficiency of each of the plurality of air-conditioning apparatus.

Advantageous Effects of Invention

According to the present invention, each air-conditioning apparatus is controlled by an optimum control command determined, for each time section, based on a heat-load change permissible range determined based on a room-temperature change permissible range and an operation efficiency of the air-conditioning apparatus. Thus, the present invention can increase the operation efficiencies of the air-conditioning apparatus while controlling a change in the room temperature within a predetermined range when the air-conditioning apparatus are in operation. As a result, the present invention can surely achieve energy-saving operation while keeping an air-conditioned space in a comfortable state.

DESCRIPTION OF EMBODIMENTS

Embodiments of the present invention will be described in detail below by using the drawings. Although steps that describe a program for performing an operation of each embodiment of the present invention indicate processes performed chronologically in the described order, the steps may encompass processes that are not necessarily performed chronologically but performed in parallel or individually.

In addition, it does not matter whether each function described in each embodiment is implemented by hardware or by software. That is, each block diagram described in each embodiment may be considered as a hardware block diagram or a software functional block diagram. For example, each block diagram may be implemented by using hardware, such as circuit devices, or by using software that is executed by a processing device, such as a processor not illustrated.

Further, individual blocks in each block diagram described in each embodiment are not necessarily separate blocks as long as functions of the individual blocks are performed. It is assumed in Embodiments 1 and 2 that items not particularly described are similar between Embodiments 1 and 2, and the same functions and configuration will be described by using the same reference signs. In addition, Embodiments 1 and 2 may be implemented individually or in combination. In any case, advantageous effects described later are exhibited. Further, various specific setting examples described in each embodiment are merely examples, and settings are not limited to these examples.

Embodiment 1

(First Configuration Example of Air-Conditioning System 1)

Figure 1:
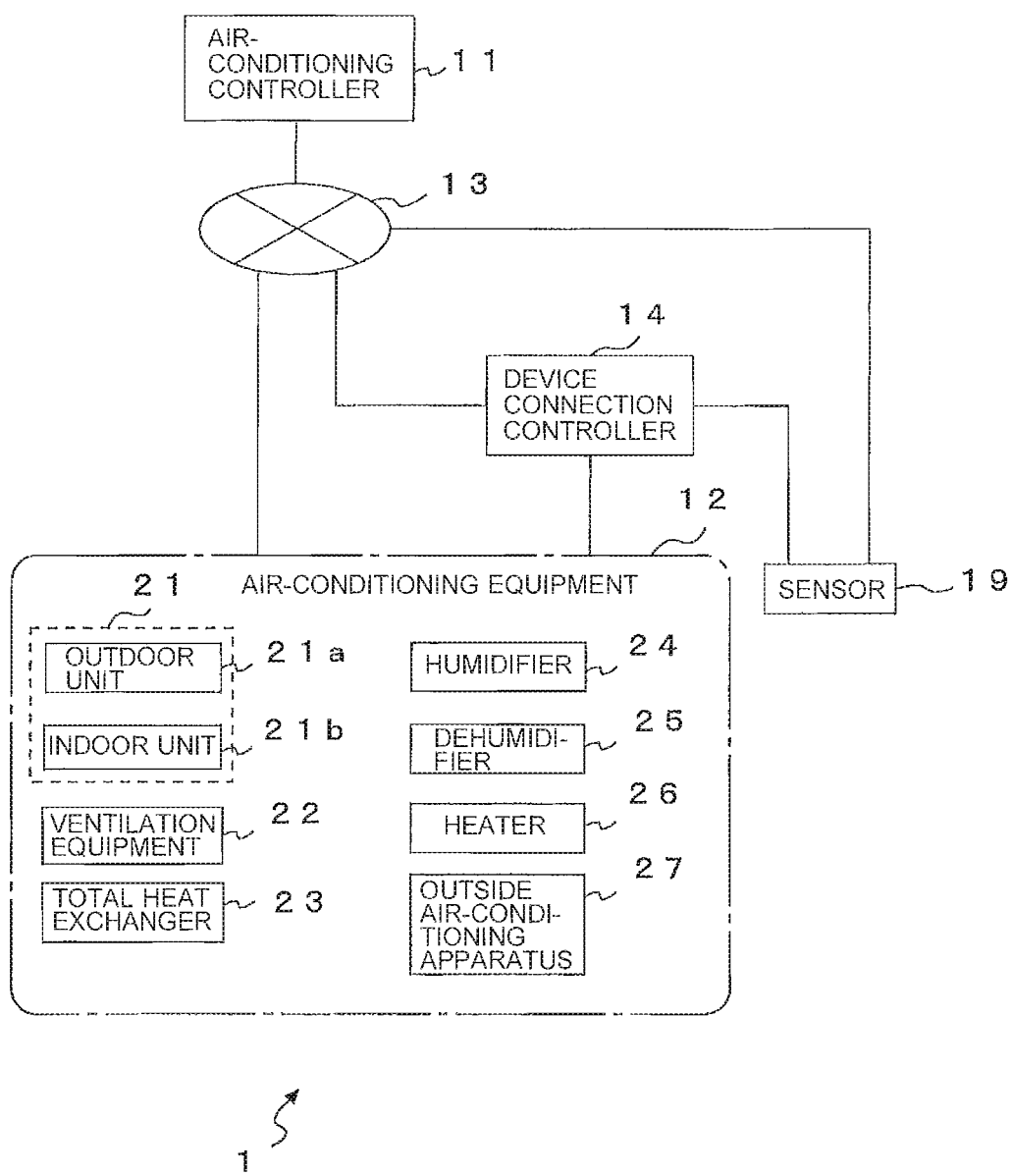
FIG. 1 is a diagram illustrating an example of a schematic configuration of an air-conditioning system 1 in Embodiment 1 of the present invention.

FIG. 1 is a diagram illustrating an example of a schematic configuration of an air-conditioning system 1 in Embodiment 1 of the present invention. As illustrated in FIG. 1, the air-conditioning system 1 includes an air-conditioning controller 11 and air-conditioning equipment 12. The air-conditioning controller 11 and the air-conditioning equipment 12 are connected to each other via an air-conditioning network 13.

The air-conditioning controller 11 controls the air-conditioning equipment 12 and monitors the air-conditioning equipment 12 by performing various kinds of communication with the air-conditioning equipment 12. FIG. 1 illustrates an example in which only one air-conditioning controller 11 is provided; however, the number of installed air-conditioning controllers 11 is not limited particularly to this value. For example, a plurality of air-conditioning controllers 11 may be provided. In addition, a plurality of air-conditioning controllers 11 may be provided at separate locations. The air-conditioning controller 11 is installed typically at an administration office in a building, for example; however, the place where the air-conditioning controller 11 is installed is not limited particularly to such a place.

As illustrated in FIG. 1, the air-conditioning equipment 12 includes components such as an outdoor unit 21a, an indoor unit 21b, ventilation equipment 22, a total heat exchanger 23, a humidifier 24, a dehumidifier 25, a heater 26, and an outside air-conditioning apparatus 27. Each of such components is usually installed in plurality. The above-described components of the air-conditioning equipment 12 are merely illustrative. Thus, the components are not limited particularly to these ones and all the components are not necessarily needed. In addition, another type of device that is not included in the above-described components of the air-conditioning equipment 12 but controls the state of the air in a room may be a component. That is, the air-conditioning equipment 12 is assumed to have one or a plurality of each of the above-described components of the air-conditioning equipment 12. Further, a plurality of pieces of the air-conditioning equipment 12 including a plurality of each of the components may be provided.

The outdoor unit 21a and the indoor unit 21b are collectively referred to as an air-conditioning apparatus 21. The example of FIG. 1 illustrates one air-conditioning apparatus 21; however, the number of air-conditioning apparatus 21 is not limited to this example. For example, two or more air-conditioning apparatus 21 may be provided. In addition, the number of outdoor units 21a and the number of indoor units 21b are not limited particularly.

The air-conditioning network 13 may be constructed as communication media over which communication compliant with a not-disclosed communication protocol is performed or as communication media over which communication compliant with a disclosed communication protocol is performed. The air-conditioning network 13 may have a configuration in which a plurality of networks of different types coexist depending on the types of cables or communication protocols. For example, a dedicated network over which measurement and control are performed on the air-conditioning equipment 12, a LAN (Local Area Network), and individual dedicated lines for different components of the air-conditioning equipment 12 are conceivable as an example of the plurality of networks of different types.

The air-conditioning controller 11 and the air-conditioning equipment 12 may be connected to each other via a device connection controller 14. The device connection controller 14 is equipped with a function of relaying data communication between the air-conditioning controller 11 and the air-conditioning equipment 12.

For example, among the components of the air-conditioning equipment 12, some of the components of the air-conditioning equipment 12 may be connected directly to the air-conditioning network 13, whereas other components of the air-conditioning equipment 12 may be connected to the device connection controller 14. The device connection controller 14 may be used to hide the difference in the communication protocol between the air-conditioning equipment 12 and the air-conditioning controller 11 or to monitor the content of communication between the air-conditioning equipment 12 and the air-conditioning controller 11.

The air-conditioning system 1 may include a sensor 19. The sensor 19 is a sensing device, such as a temperature sensor, a humidity sensor, or a $CO_2$ concentration sensor. FIG. 1 illustrates an example in which only one sensor 19 is installed; however, the number of installed sensors 19 is not limited particularly to this example. A plurality of sensors 19 may be installed. As the sensor 19, a plurality of devices that perform different kinds of sensing may be installed. As the sensor 19, a single device that performs different kinds of sensing may be installed. The place where the sensor 19 is installed is, for example, in a room that is an air-conditioned space of the air-conditioning equipment 12. In the case of sensing the outside air temperature and the amount of solar radiation, the sensor 19 may be installed outdoors.

Figure 2:
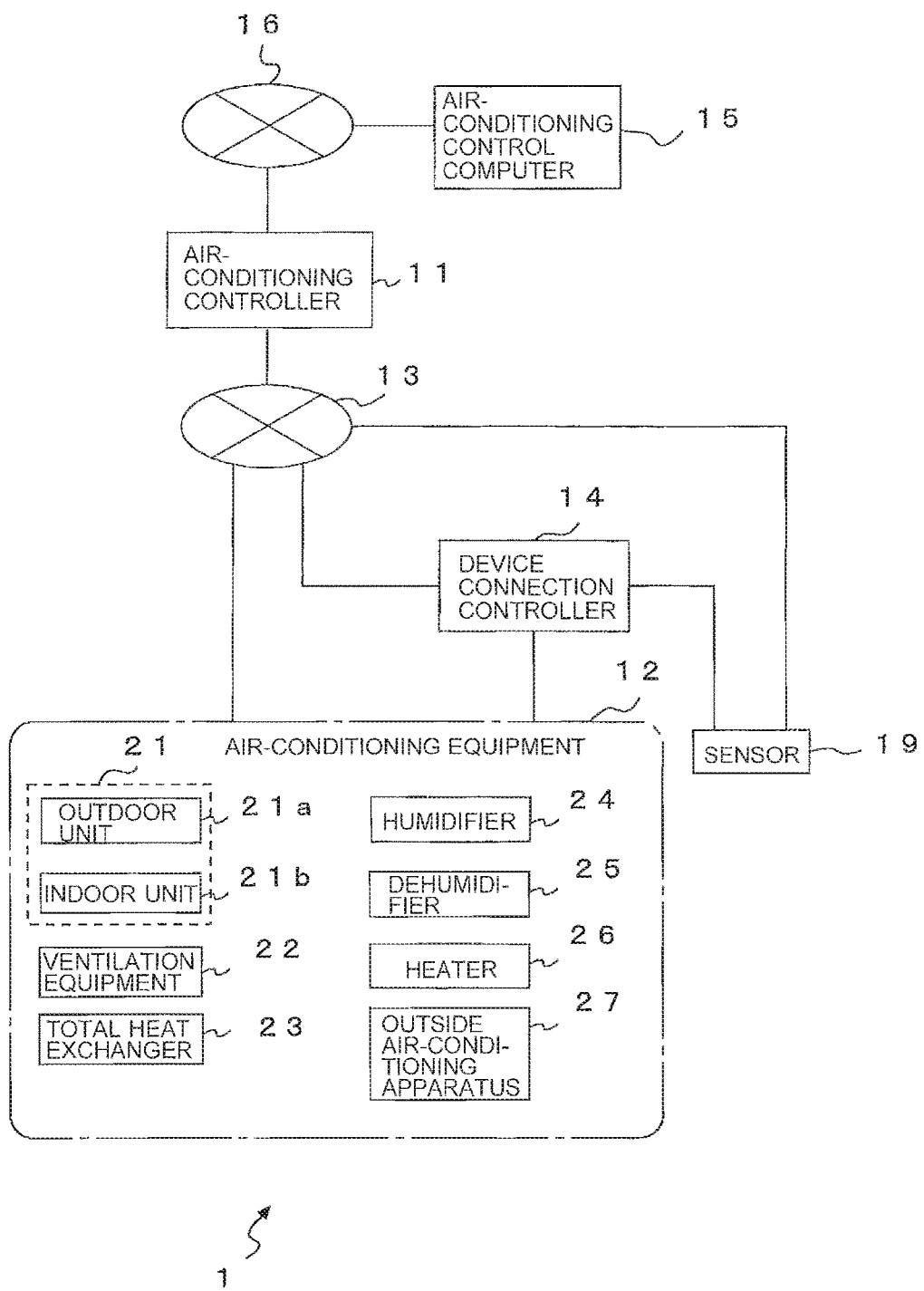
FIG. 2 is a diagram illustrating another example of the schematic configuration of the air-conditioning system 1 in Embodiment 1 of the present invention.
Figure 3:
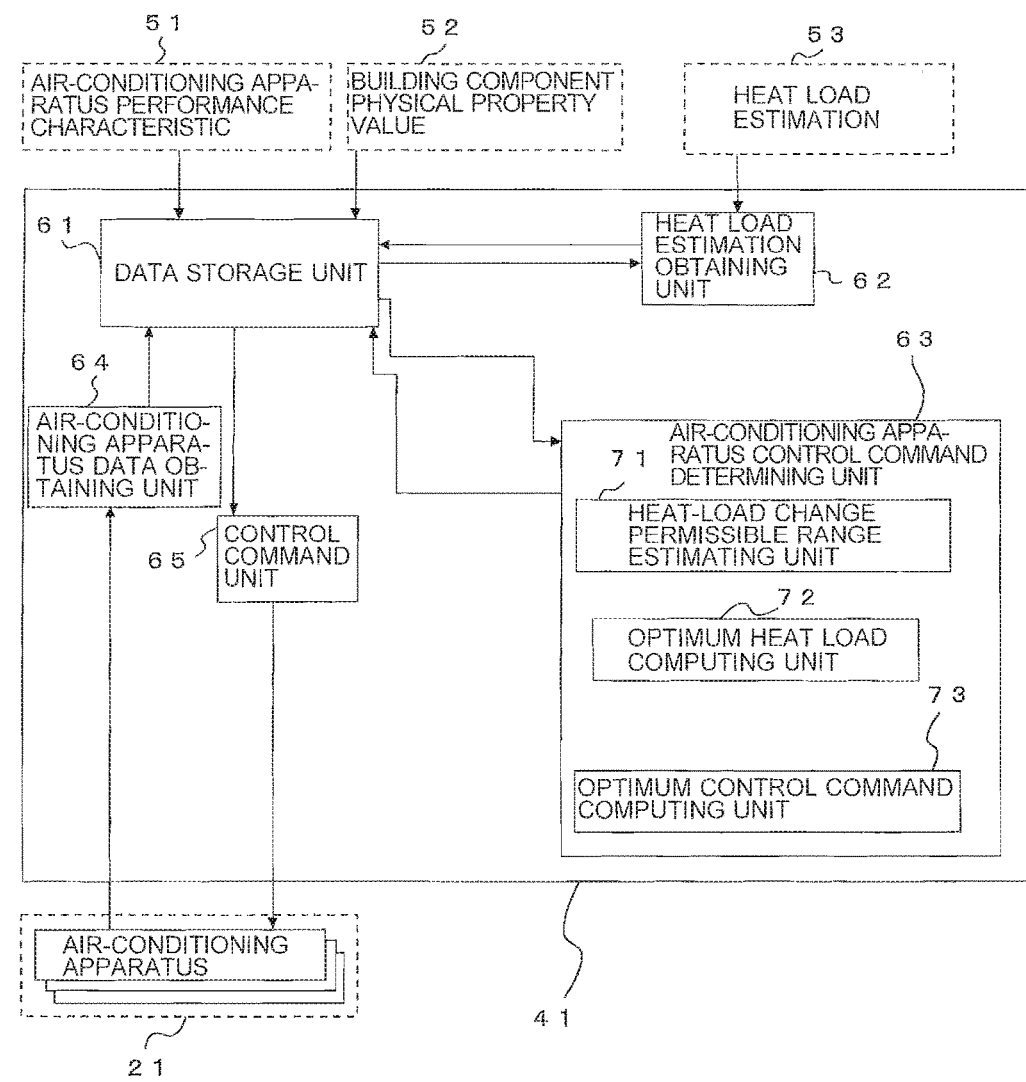
FIG. 3 is a diagram illustrating an example of a functional configuration of an air-conditioning system control device 41 in Embodiment 1 of the present invention.
Figure 4:
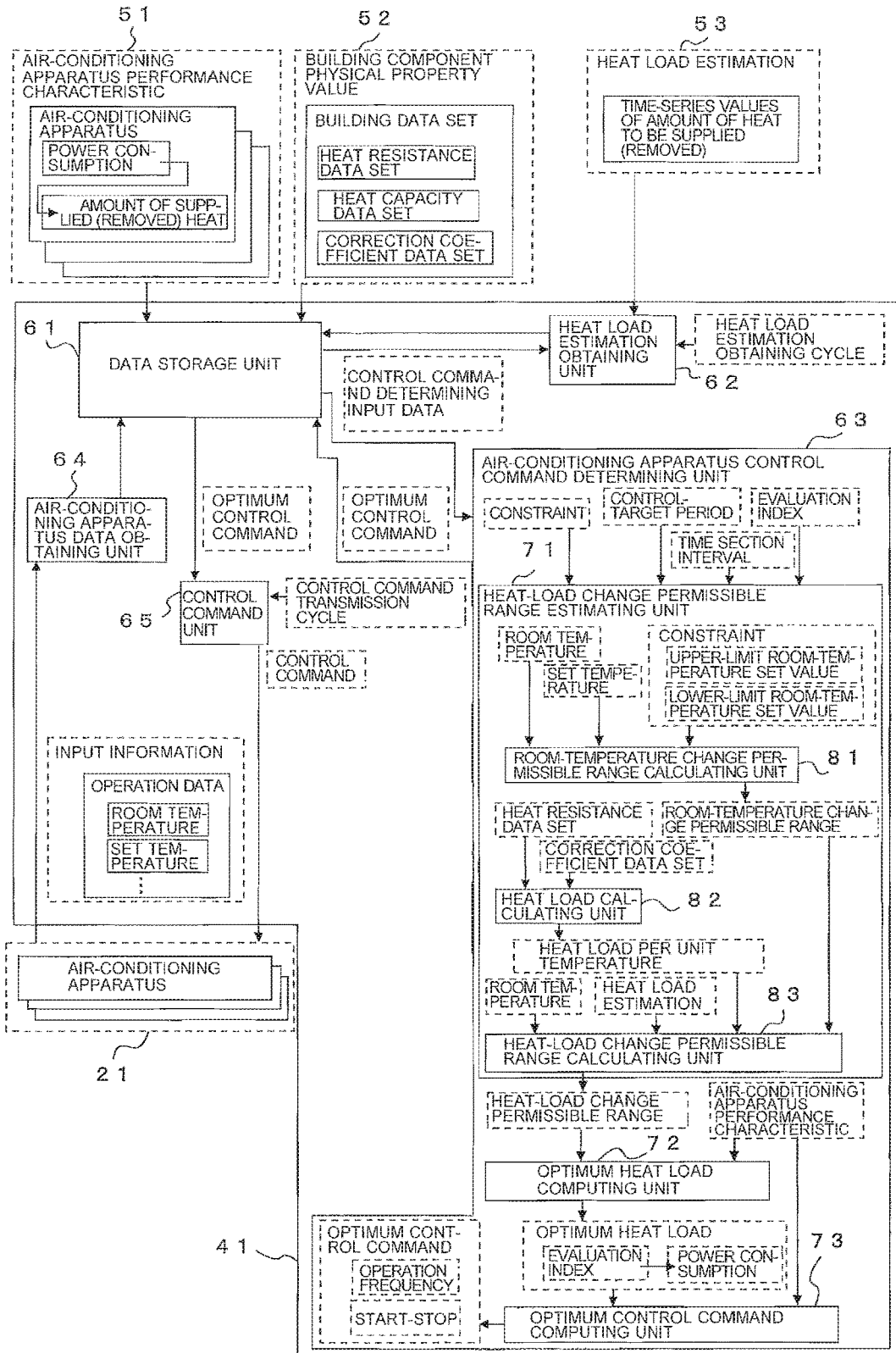
FIG. 4 is a diagram illustrating an example of a detailed functional configuration of the air-conditioning system control device 41 in Embodiment 1 of the present invention.

In the case where the air-conditioning system 1 includes the air-conditioning controller 11 as illustrated in FIG. 1, various functions described later in FIGS. 3 and 4 are performed by the air-conditioning controller 11. An example of the configuration of the air-conditioning system 1 has been described; however, the configuration of the air-conditioning system 1 is not limited particularly to this example. Another example of the configuration of the air-conditioning system 1 will be described by using FIG. 2.

(Second Configuration Example of Air-Conditioning System 1)

FIG. 2 is a diagram illustrating another example of the schematic configuration of the air-conditioning system 1 in Embodiment 1 of the present invention. As illustrated in FIG. 2, the air-conditioning system 1 includes an air-conditioning control computer 15. The air-conditioning control computer 15 is connected to the air-conditioning controller 11 via a general-purpose network 16. The air-conditioning control computer 15 performs various kinds of communication with the air-conditioning controller 11 via the general-purpose network 16.

The general-purpose network 16 is communication media compliant with a communication protocol, such as a LAN or a telephone network. Thus, when the air-conditioning control computer 15 and the air-conditioning controller 11 perform various kinds of communication, the various kinds of communication may be performed based on IP addresses or the like. In addition, the air-conditioning control computer 15 may perform various kinds of communication with the sensor 19 or the air-conditioning equipment 12 via the air-conditioning controller 11 or the device connection controller 14.

The air-conditioning control computer 15 performs various kinds of communication with the air-conditioning equipment 12 via the general-purpose network 16 to perform various computations. The air-conditioning control computer 15 may perform various kinds of communication with the device connection controller 14 or the sensor 19 via the general-purpose network 16, the air-conditioning controller 11, and the air-conditioning network 13 to obtain various kinds of data.

In the case where the air-conditioning system 1 includes the air-conditioning controller 11 and the air-conditioning control computer 15 as illustrated in FIG. 2, various functions described later in FIG. 3 may be distributed to the air-conditioning controller 11 and the air-conditioning control computer 15. The air-conditioning control computer 15 may be installed, for example, in a room that is an air-conditioned space of the air-conditioning equipment 12, similarly to the air-conditioning controller 11, or may be installed, for example, at a centralized control center where a plurality of buildings are managed from inside a site of the buildings or a site away from the buildings.

The example in which the functions are equipped to the air-conditioning controller 11 and the example in which the functions are distributed to the air-conditioning controller 11 and the air-conditioning control computer 15 have been described above; however, the way of implementing the functions is not limited particularly to these examples. For example, the functions of the air-conditioning controller 11 may be distributed to and implemented in a plurality of server devices not illustrated. In addition, for example, the functions of the air-conditioning controller 11 and the functions of the air-conditioning control computer 15 may be implemented in logically separated forms in a single server device not illustrated. That is, because each of the functions described above only need to be performed, physical storage locations and physical execution locations thereof are not limited particularly.

For example, the functions described above may be distributed to and processed in a plurality of server devices installed at separate locations, and a series of processes may be performed by synchronization of the computed results. In addition, two sets of functions may be implemented in a single server device as a result of the functions of the air-conditioning controller 11 and the functions of the air-conditioning control computer 15 being performed in logically separated forms as virtual devices as described above.

(Functional Block Diagram: Overview)

Functions implemented in the air-conditioning system 1 described above will be described next by using FIG. 3. FIG. 3 is a diagram illustrating an example of a functional configuration of an air-conditioning system control device 41 in Embodiment 1 of the present invention. As illustrated in FIG. 3, the air-conditioning system control device 41 exchanges various kinds of data or the like with the air-conditioning apparatus 21. For example, the air-conditioning system control device 41 receives input information provided by the air-conditioning apparatus 21 from the air-conditioning apparatus 21. In addition, for example, the air-conditioning system control device 41 transmits a control command to the air-conditioning apparatus 21. As illustrated in FIG. 3, a configuration including a plurality of air-conditioning apparatus 21 is assumed herein. Thus, the air-conditioning system control device 41 exchanges various kinds of data or the like with the plurality of air-conditioning apparatus 21. In the case where a configuration including one air-conditioning apparatus 21 is assumed, the air-conditioning system control device 41 exchanges various kinds of data or the like with the one air-conditioning apparatus 21. In short, the number of air-conditioning apparatus 21 is not limited particularly.

Each of the air-conditioning apparatus 21, which are controlled by the air-conditioning system control device 41, is, for example, a multi-air-conditioning apparatus for buildings including the outdoor unit 21a and the indoor unit 21b as described in FIGS. 1 and 2; however, the air-conditioning apparatus 21 is not limited particularly to this configuration. For example, each of the air-conditioning apparatus 21, which are controlled by the air-conditioning system control device 41, may be a packaged air-conditioning apparatus, a room air-conditioning apparatus, or a large heat source apparatus such as an absorption refrigerator.

The air-conditioning system control device 41 obtains an air-conditioning apparatus performance characteristic 51, a building component physical property value 52, and a heat load estimation 53. The air-conditioning apparatus performance characteristic 51 is data related to the performance characteristic of each of the air-conditioning apparatus 21, which are controlled by the air-conditioning system control device 41. The building component physical property value 52 includes values concerning various physical properties of a target building in which the air-conditioning apparatus 21 are installed. The heat load estimation 53 is a heat load estimated for the target building in which the air-conditioning apparatus 21 are installed.

Specifically, the air-conditioning system control device 41 controls the air-conditioning apparatus 21 installed in the target building, based on the input information provided by the air-conditioning apparatus 21, the air-conditioning apparatus performance characteristic 51, the building component physical property value 52, and the heat load estimation 53. As illustrated in FIG. 3, the air-conditioning system control device 41 includes a data storage unit 61, a heat load estimation obtaining unit 62, an air-conditioning apparatus control command determining unit 63, an air-conditioning apparatus data obtaining unit 64, and a control command unit 65 as functional components thereof. The air-conditioning apparatus control command determining unit 63 includes a heat-load change permissible range estimating unit 71, an optimum heat load computing unit 72, and an optimum control command computing unit 73.

(Functional Block Diagram: Details)

Figure 5:
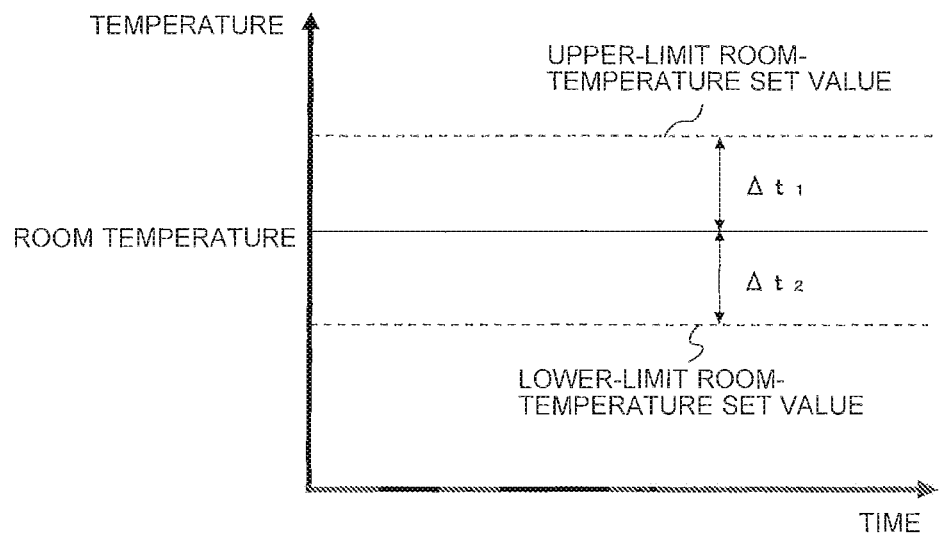
FIG. 5 is a diagram illustrating an example of a permissible range of a change in a room temperature in Embodiment 1 of the present invention.
Figure 6:
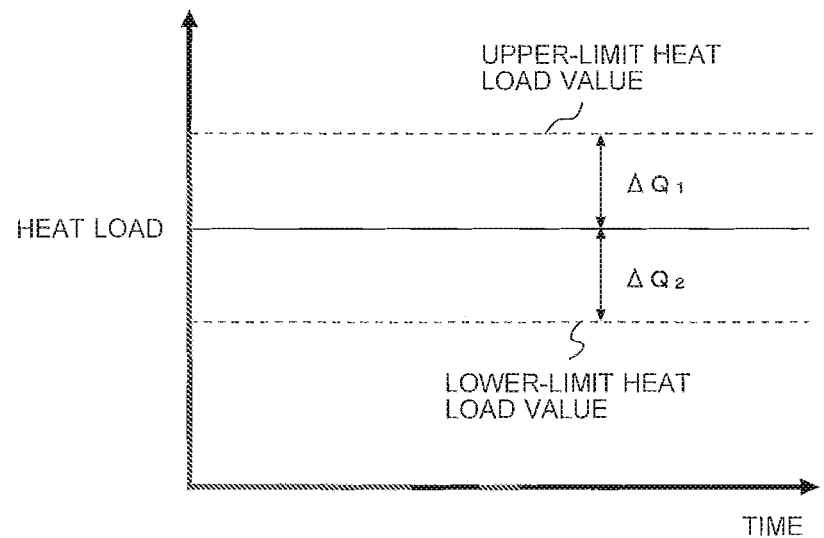
FIG. 6 is a diagram illustrating an example of a permissible range of a change in a heat load in Embodiment 1 of the present invention.
Figure 7:
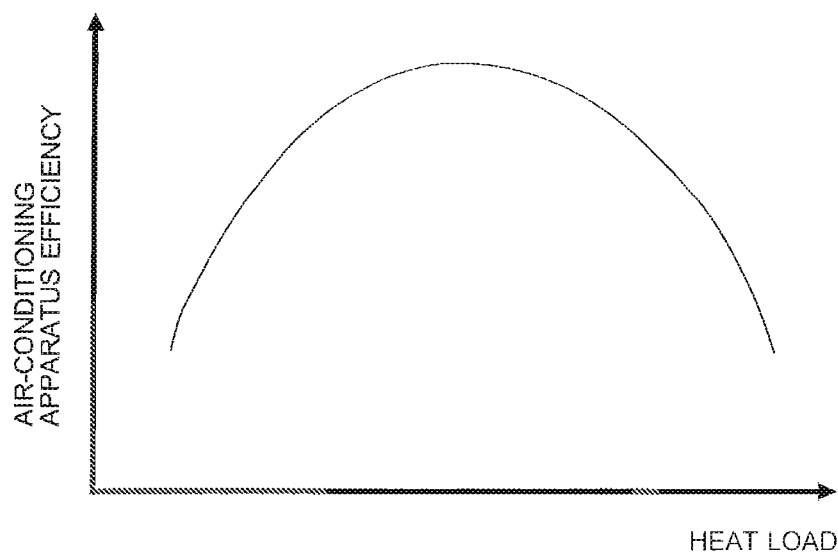
FIG. 7 is a diagram illustrating an example of a performance characteristic of an air-conditioning apparatus 21 in Embodiment 1 of the present invention.
Figure 8:
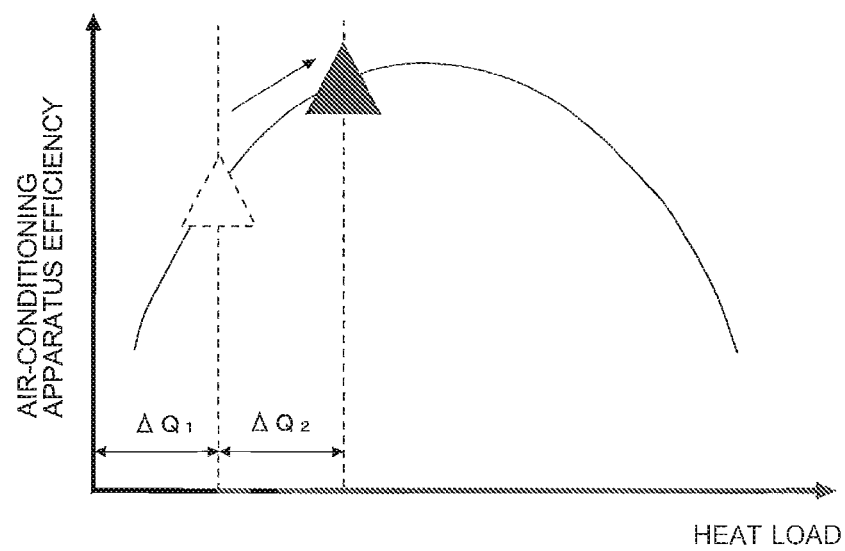
FIG. 8 is a diagram intuitively describing an algorithm for computing a heat load having high air-conditioning apparatus efficiency in Embodiment 1 of the present invention.
Figure 9:
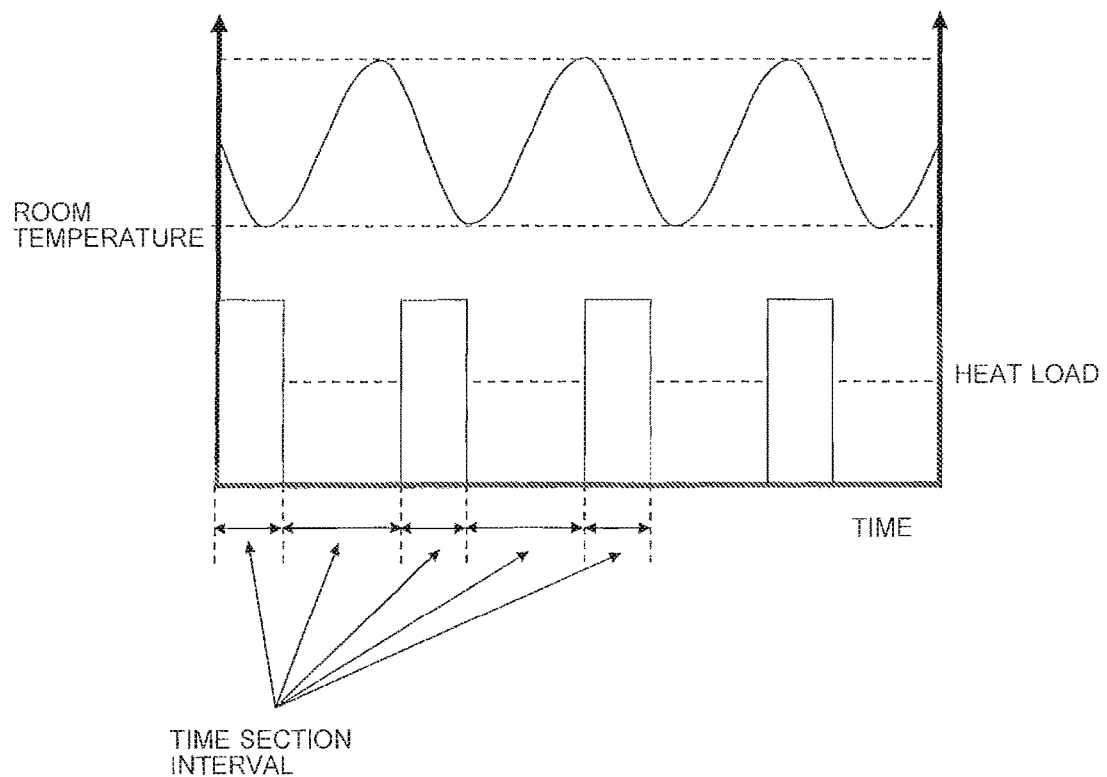
FIG. 9 is a diagram intuitively describing exemplary control performed by the air-conditioning system control device 41 in Embodiment 1 of the present invention.

Details about the various functions of the air-conditioning system control device 41 will be described next by using FIGS. 4 to 9. FIG. 4 is a diagram illustrating an example of a detailed functional configuration of the air-conditioning system control device 41 in Embodiment 1 of the present invention. FIG. 4 illustrates an example of details of input/output data of the various functions of the air-conditioning system control device 41. FIG. 4 also illustrates an example of details of the heat-load change permissible range estimating unit 71. FIG. 5 is a diagram illustrating an example of a permissible range of a change in a room temperature in Embodiment 1 of the present invention. FIG. 6 is a diagram illustrating an example of a permissible range of a change in a heat load in Embodiment 1 of the present invention. FIG. 7 is a diagram illustrating an example of the performance characteristic of the air-conditioning apparatus 21 in Embodiment 1 of the present invention. FIG. 8 is a diagram that intuitively describes an algorithm for computing a heat load having high air-conditioning apparatus efficiency in Embodiment 1 of the present invention. FIG. 9 is a diagram that intuitively describes exemplary control performed by the air-conditioning system control device 41 in Embodiment 1 of the present invention.

(Data Storage Unit 61)

The data storage unit 61 stores various kinds of data or the like obtained via the air-conditioning apparatus data obtaining unit 64. The data storage unit 61 stores various kinds of data or the like obtained via the heat load estimation obtaining unit 62. The data storage unit 61 stores the air-conditioning apparatus performance characteristic 51, the building component physical property value 52, and other data. The data storage unit 61 supplies the air-conditioning apparatus control command determining unit 63 with control command determining input data including the stored various kinds of data as components thereof. The data storage unit 61 stores various computation results obtained by the air-conditioning apparatus control command determining unit 63, such as optimum control commands for the air-conditioning apparatus 21. The data storage unit 61 supplies the stored optimum control commands to the control command unit 65.

(Air-Conditioning Apparatus Performance Characteristic 51)

Details about the air-conditioning apparatus performance characteristic 51 stored in the data storage unit 61 will be described. The air-conditioning apparatus performance characteristic 51 at least includes correlations between a power consumption and an amount of supplied (removed) heat of each of the plurality of air-conditioning apparatus 21. The air-conditioning apparatus performance characteristic 51 may be pre-registered in the data storage unit 61 through a user operation. In addition, the air-conditioning apparatus performance characteristic 51 may be determined by estimating it from operation data of each of the plurality of air-conditioning apparatus 21. Here, the operation data indicates time-series values of the room temperature and the set temperature, for example. In FIG. 4, an arrow from the power consumption to the amount of supplied (removed) heat is illustrated to indicate that the power consumption and the amount of supplied (removed) heat have a correlation and that the amount of supplied (removed) heat is associated with the corresponding power consumption; however, the configuration is not limited particularly to this example. That is, it is sufficient that a mapping relationship is formed between the power consumption and the amount of supplied (removed) heat in the data structure.

In the case where the air-conditioning apparatus performance characteristic 51 is determined by estimation, a correlation between the amount of supplied (removed) heat and the power consumption of the target air-conditioning apparatus 21 needs to be obtained. When the correlation between the amount of supplied (removed) heat and the power consumption of the target air-conditioning apparatus 21 is not stored in the data storage unit 61 from the air-conditioning apparatus data obtaining unit 64, another kind of data may be used. For example, as for the amount of supplied (removed) heat, the air-conditioning apparatus data obtaining unit 64 may measure an operation frequency of a compressor of the air-conditioning apparatus 21, a pressure of a refrigerant on the inlet side of the compressor of the air-conditioning apparatus 21, a pressure of the refrigerant on the outlet side of the compressor of the air-conditioning apparatus 21, and a refrigerant temperature determined based on a pipe temperature and may determine, by using these measured results, the correlation between the amount of supplied (removed) heat and the power consumption of the target air-conditioning apparatus 21.

Alternatively, another method can also be used. For example, as for the amount of supplied (removed) heat, the air-conditioning apparatus data obtaining unit 64 may measure an operation frequency of a compressor of the air-conditioning apparatus 21, a condensing temperature at a refrigerant circuit including the compressor of the air-conditioning apparatus 21 as a component thereof, and an evaporating temperature at the refrigerant circuit including the compressor of the air-conditioning apparatus 21 as a component thereof, and may determine, by using these measured results, the correlation between the amount of supplied (removed) heat and the power consumption of the target air-conditioning apparatus 21. In addition, as for the power consumption, the air-conditioning apparatus data obtaining unit 64 may determine the corresponding power consumption from the measurement result obtained by a wattmeter not illustrated. In the case where the air-conditioning apparatus performance characteristic 51 is determined by estimation, the air-conditioning apparatus performance characteristic 51 may be determined through a test before an operation of the air-conditioning apparatus 21, or various kinds of data related to the air-conditioning apparatus performance characteristic 51 may be accumulated while the air-conditioning apparatus 21 are in operation.

(Building Component Physical Property Value 52)

Details about the building component physical property value 52 stored in the data storage unit 61 will be described. The building component physical property value 52 includes values that indicate a heat-insulating property of the building and a heat-storage property of the building and that correspond to, for example, heat resistances, heat capacities, and correction coefficients among parameters included in equations of heat conduction expressed by Equations (1) to (3) described below. The equations of heat conduction expressed by Equations (1) to (3) represent heat that exits from and enters the building. The equations of heat conduction use, as input data, data concerning an amount of heat supplied (removed) by the air-conditioning apparatus 21, weather data including at least one of an outside air temperature and an amount of solar radiation, and data concerning internal heat generated inside the building, to determine a temporal change in the room temperature. That is, the equations of heat conduction expressed by Equations (1) to (3) are numerical formula models and room-temperature estimation models for estimating the room temperature.

[Math. 1]

$$C_1 \frac{dT_1}{dt} = \beta Q_S + \frac{(T_O - T_1)}{R_1} - \frac{(T_1 - T_2)}{R_2} \qquad (1)$$

[Math. 2]

$$C_2 \frac{dT_2}{dt} = \alpha Q_S + \mu Q_{OCC} + \lambda Q_{EQP} + \frac{(T_1 - T_2)}{R_2} - \frac{(T_2 - T_Z)}{R_Z} \qquad (2)$$

[Math. 3]

$$C_Z \frac{dT_Z}{dt} = \delta Q_{HVAC} + \rho Q_{OCC} + \gamma Q_{EQP} + \frac{(T_O - T_Z)}{R_3} - \frac{(T_2 - T_Z)}{R_Z} - \frac{(T_Z - T_{OZ})}{R_{OZ}} \qquad (3)$$

In Equations (1) to (3), $Q_s$ denotes an amount of solar radiation [kW], $Q_{occ}$ denotes an amount of heat generated by people [kW], $Q_{EQP}$ denotes an amount of heat generated by equipment [kW], and $Q_{HVAC}$ denotes an amount of heat supplied by the air-conditioning apparatus [kW]. In addition, $T_o$ denotes an outside air temperature [K], $T_1$ denotes an outdoor-side external-wall surface temperature [K], $T_2$ denotes an indoor-side external-wall surface temperature [K], $T_z$ denotes a room temperature [K], and $T_{oz}$ denotes a temperature of an adjacent zone [K]. $R_1$ denotes an outdoor-side external-wall surface heat resistance [K/kW], $R_2$ denotes an external-wall heat resistance [K/kW], $R_z$ denotes an indoor-side external-wall surface heat resistance [K/kW], $R_{oz}$ denotes a heat resistance between the target zone and the adjacent zone [K/kW], and $R_3$ denotes a heat resistance of non-external-wall components [K/kW]. $C_1$ denotes an outdoor-side external-wall heat capacity [kJ/K], $C_2$ denotes an indoor-side external-wall heat capacity [kJ/K], and $C_z$ denotes a room heat capacity [kJ/K].

α denotes a correction coefficient [-] of the amount of solar radiation that transmits to the room, β denotes a correction coefficient [-] of the amount of solar radiation that radiates onto the external wall, γ denotes a correction coefficient [-] of the amount of heat generated by equipment that affects the room temperature, δ denotes a correction coefficient [-] of the amount of heat supplied by the air-conditioning apparatus, ρ denotes a correction coefficient [-] of the amount of heat generated by people that affects the room temperature, μ denotes a correction coefficient [-] of the amount of heat generated by people that affects the indoor-side external-wall surface temperature, and λ denotes a correction coefficient [-] of the amount of heat generated by equipment that affects the indoor-side external-wall surface temperature.

Equations (1) to (3) are equations that assume the case where only one adjacent zone is present. In the case where the target zone is adjacent to a plurality of zones, the equations may be modified so that $T_{oz}$ and $R_{oz}$ are provided for each corresponding zone. Although Equations (1) to (3) are equations for one zone, individual numerical formula models may be used for respective zones. In addition, equations for all zones may be derived, and a numerical formula model for the entire air-conditioning control target area may be derived by combining the derived equations. In addition, the building component physical property value 52 may include values that are calculated from, for example, building data such as structural data of the building, that is, a material of the wall, a thickness of the wall, an area of the wall, and measures of the room. Further, the building component physical property value 52 may be determined by applying various kinds of measured data to a modification of the equations of heat conduction expressed by Equations (1) to (3) described above.

Specifically, the equations of heat conduction expressed by Equations (1) to (3) are modified to general forms, such as state space models that are used in the control theory and the system identification. By using a gray-box model based on the resulting general form and various kinds of measured data, the heat resistances, the heat capacities, the correction coefficients, and other data are determined. The determined heat resistance data set, heat capacity data set, and correction coefficient data set are defined as the building component physical property value 52. Note that the building component physical property value 52 may be pre-registered in the data storage unit 61 through a user operation. In addition, the building component physical property value 52 may be updated from outside of the air-conditioning system control device 41 at any time.

(Heat Load Estimation Obtaining Unit 62)

The heat load estimation obtaining unit 62 obtains the heat load estimation 53, which is a heat load estimated for the target building in which the air-conditioning apparatus 21 are installed, from outside of the air-conditioning system control device 41 and supplies the obtained heat load estimation 53 to the data storage unit 61. The heat load estimation obtaining unit 62 obtains the heat load estimation 53 via communication media; however, the communication media used is not limited particularly. The communication media may be, for example, wired media or wireless media. The heat load estimation obtaining unit 62 is supplied with a heat load estimation obtaining cycle that indicates timings at which the heat load estimation 53 is obtained regularly. Thus, the heat load estimation obtaining unit 62 obtains the heat load estimation 53 from outside at the heat load estimation obtaining cycle.

(Heat Load Estimation 53)

The heat load estimation 53 obtained by the heat load estimation obtaining unit 62 is time-series values of the amount of heat to be supplied (removed) by each air-conditioning apparatus 21 to make the room temperature of the air-conditioned space at the set temperature. The amount of heat to be supplied indicates, for example, an amount of heat for heating. The amount of heat to be removed indicates, for example, an amount of heat for cooling. When a consistent representation is used so that the amount of heat to be supplied is expressed as a positive amount-of-heat value, the amount of heat to be removed is expressed as a negative amount-of-heat value. In contrast, when a consistent representation is used so that the amount of heat to be removed is expressed as a positive amount-of-heat value, the amount of heat to be supplied is expressed as a negative amount-of-heat value.

Because the heat load estimation 53 is time-series values of the amount of heat to be supplied (removed) by each air-conditioning apparatus 21, it is expressed as an estimation of a temporal change in the amount of heat. The heat load estimation 53 is determined by a heat load estimation model in which heat characteristics of the building are modeled, as expressed by Equations (1) to (3) described above, for example. The heat load estimation model can be derived from a room temperature estimation model that is defined by the equation of heat conduction described above. Note that the heat load estimation model is not necessarily defined based on the equation of heat conduction. For example, the heat load estimation model is not limited particularly as long as the heat load estimation model is a model that allows estimation of a heat load from available input data.

(Air-Conditioning Apparatus Control Command Determining Unit 63)

The air-conditioning apparatus control command determining unit 63 determines a control command given to each air-conditioning apparatus 21. Specifically, the air-conditioning apparatus control command determining unit 63 determines a control command given to each air-conditioning apparatus 21 so that a preset evaluation index is maximized or minimized, that is, the preset evaluation index satisfies a preset condition, in a preset control-target period under a preset constraint. To perform the above-described function, the air-conditioning apparatus control command determining unit 63 includes the heat-load change permissible range estimating unit 71, the optimum heat load computing unit 72, and the optimum control command computing unit 73.

The air-conditioning apparatus control command determining unit 63 determines an operation frequency of the air-conditioning apparatus 21 and stop-start of the air-conditioning apparatus 21 so that the heat load to be processed is processed in a time-shifted manner. Specifically, time sections that are units of division intervals used to divide the control-target period into a plurality of time periods are set in the air-conditioning apparatus control command determining unit 63. Over the control-target period, the air-conditioning apparatus control command determining unit 63 processes, for each time section, the heat load to be processed. Based on the constraint, the air-conditioning apparatus control command determining unit 63 determines a room-temperature change permissible range. Based on the room-temperature change permissible range, the air-conditioning apparatus control command determining unit 63 determines a heat-load change permissible range. The air-conditioning apparatus control command determining unit 63 determines an air-conditioning apparatus operation efficiency from the air-conditioning apparatus performance characteristic 51. The air-conditioning apparatus control command determining unit 63 evaluates, by using the evaluation index, a characteristic relationship concerning the air-conditioning apparatus 21 that is determined based on the heat-load change permissible range and the air-conditioning apparatus operation efficiency, and determines the operation frequency of the air-conditioning apparatus 21 and start-stop of the air-conditioning apparatus 21 for which the evaluation index satisfies the preset condition.

The control-target period will be described specifically. The control-target period is a period over which the air-conditioning apparatus 21 are controlled from among a given period. The control-target period may be a continuous period, such as 8:00 to 22:00, for example. Alternatively, the control-target period may be constituted by a plurality of periods, such as 8:00 to 12:00 and 13:00 to 22:00, for example. As described above, time sections are set in the control-target period. For example, when the time sections are set to division intervals of 5 minutes, 6 time sections are present in a period of 8:30 to 9:00. Note that the case of 5 minutes has been described as an example of the time sections here; however, the duration of the time sections is not limited to this value. The duration of the time sections may be 3 minutes or 7.5 minutes. In addition, the duration of the time sections is not necessarily a fixed interval, as in the case where the time sections are 5 minutes long up to a certain time point and is 3 minutes long after the certain time point. In any case, the air-conditioning apparatus control command determining unit 63 determines an optimum control command for each time section. That is, the air-conditioning apparatus control command determining unit 63 repeats a process of determining an optimum control command for every time section.

The constraint will be described specifically. The constraint, for example, maintains the room temperature within a range between preset upper and lower limits. The range between the preset upper and lower limits is a permissible range of a change in the room temperature that is defined between a preset upper-limit room-temperature set value and a preset lower-limit room-temperature set value. The preset upper-limit room-temperature set value and the preset lower-limit room-temperature set value can be set by the user. Thus, the user can individually set each of the preset upper-limit room-temperature set value and the preset lower-limit room-temperature set value.

The preset upper-limit room-temperature set value and the preset lower-limit room-temperature set value may be determined by setting an upper-limit value of a difference between the room temperature and the set temperature. For example, the absolute value of the upper-limit value of the difference is set to be 1 degree C. and the set temperature is assumed to be 27 degrees C. According to such an assumption, the preset upper-limit room-temperature set value and the preset lower-limit room-temperature set value are ±1 degree C. of the set temperature. Thus, the preset upper-limit room-temperature set value is set to 28 degrees C., and the preset lower-limit room-temperature set value is set to 26 degrees C. Although details will be described later, the heat-load change permissible range estimating unit 71 determines the heat-load change permissible range so that such a constraint is satisfied.

The evaluation index will be described specifically. The evaluation index is determined from the air-conditioning apparatus performance characteristic 51, for example. In the air-conditioning apparatus performance characteristic 51, a power consumption of each of the plurality of air-conditioning apparatus 21 and an amount of heat supplied (removed) by the corresponding air-conditioning apparatus 21 are associated. In the case of controlling the air-conditioning apparatus 21 to save energy, the air-conditioning apparatus 21 is controlled so that the power consumption of the air-conditioning apparatus 21 is minimized. Thus, when the purpose of controlling the air-conditioning apparatus 21 is energy saving, the power consumption is adopted as the evaluation index. The case of adopting the power consumption as an example of the evaluation index has been described here; however, the evaluation index is not limited particularly to this example.

Details about the heat-load change permissible range estimating unit 71, the optimum heat load computing unit 72, and the optimum control command computing unit 73 mentioned above will be sequentially described next.

(Heat-Load Change Permissible Range Estimating Unit 71)

The heat-load change permissible range estimating unit 71 determines a heat-load change permissible range that is a permissible range of a change in the heat load to be processed, based on the room temperature of the air-conditioned space of the air-conditioning apparatus 21 that is obtained via the air-conditioning apparatus data obtaining unit 64, the upper-limit room-temperature set value and the lower-limit room-temperature set value, which are the constraint, the heat load estimation 53 obtained via the heat load estimation obtaining unit 62, and the building component physical property value 52. Specifically, the heat-load change permissible range estimating unit 71 includes a room-temperature change permissible range calculating unit 81, a heat load calculating unit 82, and a heat-load change permissible range calculating unit 83.

(Room-Temperature Change Permissible Range Calculating Unit 81)

As described above, the room-temperature change permissible range calculating unit 81 determines a room-temperature change permissible range from the permissible range of the change in the room temperature. That is, the room-temperature change permissible range is a subset of the constraint. For example, in the case where the upper-limit room-temperature set value and the lower-limit room-temperature set value are set based on a difference between the set temperature of the air-conditioning apparatus 21 and the room temperature, the room-temperature change permissible range calculating unit 81 determines the upper-limit room-temperature set value and the lower-limit room-temperature set value, based on the set temperature and the difference.

For example, when the set temperature is 27 degrees C. and the difference is set to 1 degree C., ±1 degree C. of the set temperature is set as the upper-limit room-temperature set value and the lower-limit room-temperature set value. Thus, the room-temperature change permissible range is set to a range from 26 degrees C. to 28 degrees C. For example, when it is assumed that $\Delta t_1$ illustrated in FIG. 5 is +1 degree C. and that $\Delta t_2$ illustrated in FIG. 5 is -1 degree C., the upper-limit room-temperature set value is set to +1 degree C. of the set temperature, and the lower-limit room-temperature set value is set to -1 degree C. of the set temperature. In addition, for example, in the case where the upper-limit room-temperature set value and the lower-limit room-temperature set value are individually set, the individually set upper-limit room-temperature set value and lower-limit room-temperature set value may be set as the room-temperature change permissible range.

(Heat Load Calculating Unit 82)

The heat load calculating unit 82 determines a heat load per unit temperature by applying heat resistance data included in the heat resistance data set of the building component physical property value 52 and correction coefficient data included in the correction coefficient data set of the building component physical property value 52 to a numerical formula expressed by Equation (4).

[Math. 4]

$$\Delta Q = \frac{1}{\delta}\left(\frac{1}{R_3} + \frac{1}{R_Z}\right) \quad (4)$$

Equation (4) expresses an amount of heat needs to be supplied (removed) by the air-conditioning apparatus 21 to change the room temperature of the room for which the air-conditioning apparatus 21 is installed by 1 K. Thus, in the case where a plurality of rooms are present, the heat load calculating unit 82 determines, for each room, a heat load per unit temperature by using Equation (4). Here, $\Delta Q$ denotes the heat load per unit temperature [kW], $R_z$ denotes the indoor-side external-wall heat resistance [K/kW], $R_3$ denotes the heat resistance of non-external-wall components [K/kW], and $\delta$ denotes the correction coefficient [-] of the amount of heat supplied (removed) by the air-conditioning apparatus 21. When it is assumed that $\Delta t$ denotes a unit temperature [K], $\Delta Q$ of Equation (4) is $\Delta Q/\Delta t$, strictly speaking; however, the following description will be given on an assumption that $\Delta Q$ indicates $\Delta Q/\Delta t$ for convenience. Note that equation other than Equation (4) may be used as long as the equation uses the building component physical property value 52.

(Heat-Load Change Permissible Range Calculating Unit 83)

The heat-load change permissible range calculating unit 83 determines a heat-load change permissible range, based on the room-temperature change permissible range determined by the room-temperature change permissible range calculating unit 81, the heat load per unit temperature determined by the heat load calculating unit 82, the room temperature measured by using the air-conditioning apparatus data obtaining unit 64, and the heat load estimation 53 obtained via the heat load estimation obtaining unit 62. Specifically, the heat-load change permissible range is determined by Equation (5) below.

[Math. 5]

$$Q_{HVAC} + \Delta Q \times (t_{max} - t_{measure}) \leq Q \leq Q_{HVAC} + \Delta Q \times (t_{min} - t_{measure}) \quad (5)$$

Here, Q denotes a heat load [kW], $Q_{HVAC}$ denotes the obtained heat load estimation [kW], $\Delta Q$ denotes the heat load per unit temperature [kW/K], $t_{measure}$ denotes a measured room temperature [K], $t_{max}$ denotes the upper-limit room temperature [K], and $t_{min}$ denotes the lower-limit room temperature [K]. Note that Equation (5) expresses a range for cooling operation where the heat load for $t_{min}$ is larger than $t_{max}$. Equation (5) expresses the case where the heat load for $t_{max}$ is larger than $t_{min}$ as a result of $t_{max}$ and $t_{min}$ being switched for heating operation.

Equation (5) includes, as its parameters, the room-temperature change permissible range, that is, the upper-limit room temperature and the lower-limit room temperature. The upper-limit room temperature is a subset of the upper-limit room-temperature set value. The lower-limit room temperature is a subset of the lower-limit room-temperature set value. That is, the upper-limit room temperature and the lower-limit room temperature are a subset of the constraint. Thus, when the optimum heat load is determined within the heat-load change permissible range determined by using Equation (5), the room temperature is kept within the room-temperature change permissible range, that is, in a range from 26 degrees C. to 28 degrees C. in the above example. Thus, when the optimum heat load is determined within the heat-load change permissible range determined by using Equation (5), the determined optimum heat load satisfies the constraint. That is, $\Delta Q_1$ illustrated in FIG. 6 is $Q_{HVAC} + \Delta Q \times (t_{min} - t_{measure})$, and $\Delta Q_2$ illustrated in FIG. 6 is $Q_{HVAC} + \Delta Q \times (t_{max} - t_{measure})$, and the optimum heat load is determined in a range between $\Delta Q1$ and $\Delta Q2$.

(Optimum Heat Load Computing Unit 72)

The optimum heat load computing unit 72 determines a heat load that maximizes or minimizes the evaluation index in the control-target period under the constraint, based on the heat-load change permissible range determined by the heat-load change permissible range estimating unit 71 and the air-conditioning apparatus performance characteristic 51. Specifically, the optimum heat load computing unit 72 determines the optimum heat load, based on the heat-load change permissible range determined by the heat-load change permissible range calculating unit 83 and the air-conditioning apparatus performance characteristic 51. Because the heat-load change permissible range determined by the heat-load change permissible range calculating unit 83 satisfies the constraint as described above, a heat load that makes the air-conditioning apparatus efficiency, which is the evaluation index, highest is selected as the optimum heat load.

A correlation between the air-conditioning apparatus efficiency and the heat load will be described first. FIG. 7 illustrates a correlation between the air-conditioning apparatus efficiency and the heat load. The performance characteristic of the air-conditioning apparatus 21 illustrated in FIG. 7 is determined from the air-conditioning apparatus performance characteristic 51. In the air-conditioning apparatus performance characteristic 51, the power consumption and the amount of supplied (removed) heat are associated with each other.

Then, the heat-load change permissible range is applied to the performance characteristic of the air-conditioning apparatus 21 illustrated in FIG. 7. FIG. 8 illustrates the result. Specifically, a heat load corresponding to the highest air-conditioning apparatus performance characteristic 51, from among the air-conditioning apparatus performance characteristics 51 for $\Delta Q_1$ and $\Delta Q_2$, is the optimum heat load that satisfies the constraint and that allows the evaluation index to satisfy the preset condition.

There is a case where it is possible to stop the air-conditioning apparatus 21. For example, it is assumed that a heat load corresponding to a preset air-conditioning apparatus efficiency or higher is set. Specifically, it is assumed that a lower-limit heat load obtained by subtracting 10% from the heat load corresponding to the highest air-conditioning apparatus efficiency is set regardless of the heat-load change permissible range. In this case, when the heat-load change permissible range is set to be lower than the lower-limit heat load, the air-conditioning system control device 41 only needs to supply the air-conditioning apparatus 21 with a control command for stopping the air-conditioning apparatus 21.

(Optimum Control Command Computing Unit 73)

The optimum control command computing unit 73 determines an optimum control command given to the air-conditioning apparatus 21 to process the optimum heat load, based on the optimum heat load determined by the optimum heat load computing unit 72 and the air-conditioning apparatus performance characteristic 51. Specifically, the optimum control command computing unit 73 determines an operation frequency of the air-conditioning apparatus 21 and start-stop of the air-conditioning apparatus 21 by applying the optimum heat load and coefficients calculated from the air-conditioning apparatus performance characteristic 51 to Equation (6) below.

[Math. 6]

$$Q = af^2 + bf + c \qquad (6)$$

Q denotes the determined optimum heat load [kW], f denotes the operation frequency [Hz] of the air-conditioning apparatus 21, and a, b, and c denote coefficients calculated from the air-conditioning apparatus performance characteristic 51. For example, when the optimum heat load is 0, a control command for stopping the air-conditioning apparatus 21 is the optimum control command. In addition, the optimum control command computing unit 73 may determine, as a control command given to the air-conditioning apparatus 21, an operation mode of the air-conditioning apparatus 21 based on the sign of the optimum heat load.

For example, it is assumed that the optimum heat load is computed based on the amount of heat to be supplied. In this case, a control command given to the air-conditioning apparatus 21 may be determined so that the operation mode is set to the heating mode when the sign of the optimum heat load is plus, the operation mode is set to the cooling mode when the sign of the optimum heat load is minus, and the operation mode is set to the air-sending mode when the optimum heat load is zero. In the case where it is assumed that the optimum heat load is computed based on the amount of heat to be removed, the determination for the heating mode and the determination for the cooling mode are made opposite to those in the above description.

(Air-Conditioning Apparatus Data Obtaining Unit 64)

The air-conditioning apparatus data obtaining unit 64 obtains various kinds of data concerning the air-conditioning apparatus 21 via communication media; however, the communication media used is not limited particularly. The communication media may be wired media or wireless media, for example. Specifically, the air-conditioning apparatus data obtaining unit 64 measures operation data of the air-conditioning apparatus 21 that is needed by the air-conditioning apparatus control command determining unit 63. The operation data of the air-conditioning apparatus 21 is input information supplied from the air-conditioning apparatus 21 and includes at least the room temperature of a room for which the air-conditioning apparatus 21 is installed. The operation data of the air-conditioning apparatus 21 may include the set temperature of the room for which the air-conditioning apparatus 21 is installed.

Note that the air-conditioning apparatus data obtaining unit 64 may measure data used by units other than the air-conditioning apparatus control command determining unit 63, for example, data needed in the case of uniquely computing the air-conditioning apparatus performance characteristic 51. The data from which the air-conditioning apparatus performance characteristic 51 can be uniquely computed may be, for example, an operation frequency of a compressor included in the air-conditioning apparatus 21, a refrigerant pressure at the inlet of the compressor included in the air-conditioning apparatus 21, a refrigerant pressure at the outlet of the compressor included in the air-conditioning apparatus 21, and a refrigerant temperature determined from a pipe temperature. In addition, the data from which the air-conditioning apparatus performance characteristic 51 can be uniquely computed may be, for example, an operation frequency of the compressor included in the air-conditioning apparatus 21, a condensing temperature at a refrigerant circuit including the compressor of the air-conditioning apparatus 21, and an evaporating temperature at the refrigerant circuit including the compressor of the air-conditioning apparatus 21. In addition, the air-conditioning apparatus data obtaining unit 64 may measure, when needed, data from various sensors installed independently of the air-conditioning apparatus 21, such as a temperature sensor for measuring the room temperature.

(Control Command Unit 65)

The control command unit 65 transmits a control command given to the air-conditioning apparatus 21 to the air-conditioning apparatus 21. The control command unit 65 is supplied with a control command transmission cycle that indicates timings at which a control command is transmitted regularly. Thus, the control command unit 65 supplies the air-conditioning apparatus 21 with a control command at every control command transmission cycle. Specifically, the control command unit 65 obtains the optimum control command stored in the data storage unit 61, converts the optimum control command into a format suitable for each of the plurality of air-conditioning apparatus 21, and supplies the resulting control command to each of the plurality of air-conditioning apparatus 21 at every control command transmission cycle. As a result of repetition of the above-described process for each time section, the room temperature is controlled as illustrated in FIG. 9.

Note that various computations performed by the air-conditioning system control device 41 described above may be performed by applying various parameters to Equations (1) to (6) described above. When a table in which various parameters and results obtained by applying the various parameters to Equations (1) to (6) are associated with each other is created in advance, the various computations performed by the air-conditioning system control device 41 described above are performed by referring to the table. In the case of using such a table, the computation may be performed for various kinds of data that do not exist by performing an interpolation process. In any case, it is sufficient that the various computations based on the above-described algorithm are performed, and thus the embodiment of such computations is not limited particularly.

Figure 10:
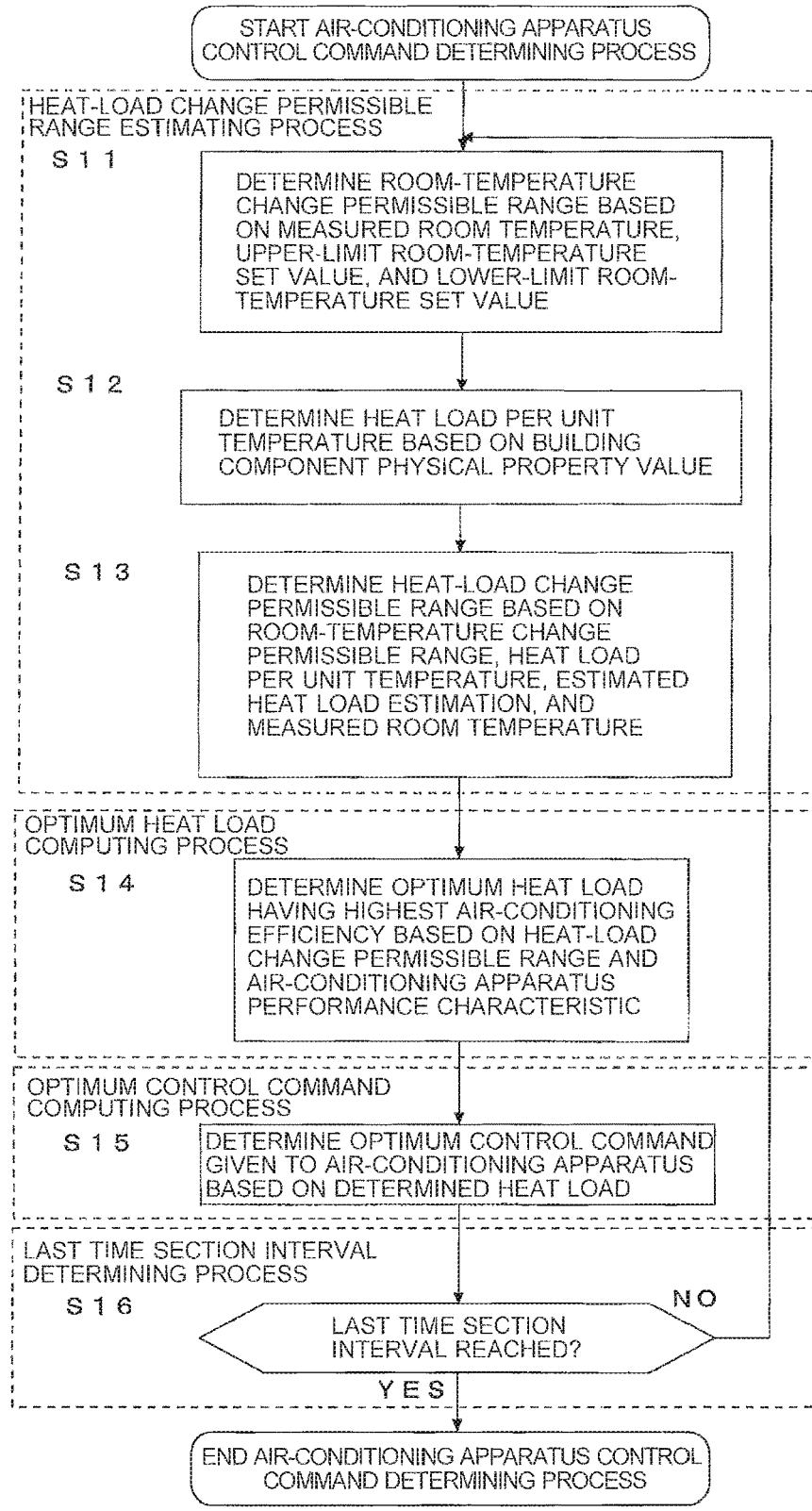
FIG. 10 is a flowchart describing an example of an air-conditioning apparatus control command determining process in the exemplary control performed by the air-conditioning system control device 41 in Embodiment 1 of the present invention.

An exemplary operation of the air-conditioning system control device 41 will be described next on the assumption of the functional configuration described above. FIG. 10 is a flowchart describing an example of an air-conditioning apparatus control command determining process in the exemplary control performed by the air-conditioning system control device 41 in Embodiment 1 of the present invention. As illustrated in FIG. 10, processing of step S11 to step S13 corresponds to a heat-load change permissible range estimating process. Processing of step S14 corresponds to an optimum heat load computing process. Processing of step S15 corresponds to an optimum control command computing process. Processing of step S16 corresponds to a last time-section-interval determining process.

The air-conditioning system control device 41 determines a control command given to the air-conditioning apparatus 21 through a series of processes including the heat-load change permissible range estimating process, the optimum heat load computing process, and the optimum control command computing process so that a preset evaluation index satisfies a preset condition, for example, the present evaluation index is maximized or minimized in a preset control-target period under a preset constraint. An example of maximizing or minimizing the evaluation index has been described above; however, the configuration is not limited particularly to this example. For example, a control command given to the air-conditioning apparatus 21 may be determined so that −10% is achieved with respect to the evaluation index.

(Air-Conditioning Apparatus Control Command Determining Process)
(Heat-Load Change Permissible Range Estimating Process)
(Step S11)

The air-conditioning system control device 41 determines a room-temperature change permissible range, based on the measured room temperature, the upper-limit room-temperature set value, and the lower-limit room-temperature set value.

(Step S12)

The air-conditioning system control device 41 determines a heat load per unit temperature, based on the building component physical property value 52.

(Step S13)

The air-conditioning system control device 41 determines a heat-load change permissible range, based on the room-temperature change permissible range, the heat load per unit temperature, the estimated heat load estimation 53, and the measured room temperature.

(Optimum Heat Load Computing Process)
(Step S14)

The air-conditioning system control device 41 determines an optimum heat load having the highest air-conditioning efficiency, based on the heat-load change permissible range and the air-conditioning apparatus performance characteristic 51.

(Optimum Control Command Computing Process)
(Step S15)

The air-conditioning system control device 41 determines an optimum control command given to the air-conditioning apparatus 21, based on the determined heat load.

(Last Time Section Interval Determining Process)
(Step S16)

The air-conditioning system control device 41 determines whether the last time section interval is reached. When the last time section interval is reached, the air-conditioning system control device 41 ends the air-conditioning apparatus control command determining process. On the other hand, when the last time section interval is not reached, the process performed by the air-conditioning system control device 41 returns to step S11.

Figure 11:
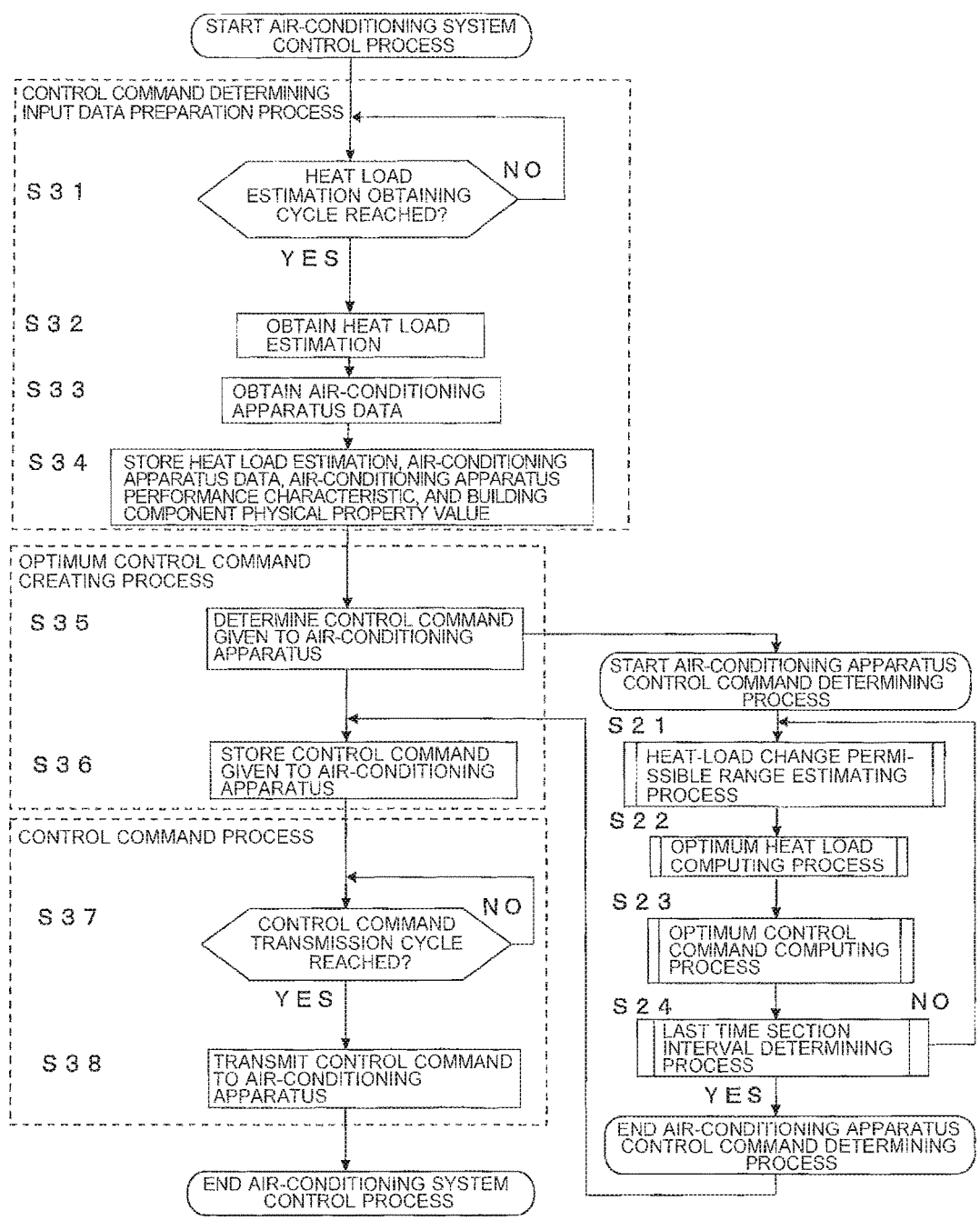
FIG. 11 is a flowchart describing an example of a series of operations for controlling the air-conditioning apparatus 21 in the exemplary control performed by the air-conditioning system control device 41 in Embodiment 1 of the present invention.

An operation performed by the air-conditioning system control device 41 to control the air-conditioning apparatus 21 will be described next on the assumption of the exemplary operation of the air-conditioning apparatus control command determining process described above. FIG. 11 is a flowchart describing an example of a series of operations for controlling the air-conditioning apparatus 21 in the exemplary control performed by the air-conditioning system control device 41 in Embodiment 1 of the present invention. As illustrated in FIG. 11, processing of step S31 to step S34 corresponds to a control command determining input data preparation process. Processing of step S35 and Step S36 corresponds to an optimum control command creating process. Processing of step S37 and S38 corresponds to a control command process.

The processing of step S35 is a process for causing the air-conditioning apparatus control command determining process described using FIG. 10 to operate. Thus, a heat-load change permissible range estimating process corresponding to processing of step S21 of FIG. 11 corresponds to the processing of step S11 to step S13 of FIG. 10. An optimum heat load computing process corresponding to processing of step S22 of FIG. 11 corresponds to step S14 of FIG. 10. An optimum control command computing process corresponding to processing of step S23 of FIG. 11 corresponds to step S15 of FIG. 10. A last time section interval determining process corresponding to processing of step S24 of FIG. 11 corresponds to step S16 of FIG. 10.

(Air-Conditioning Apparatus Control Command Determining Process)
(Step S21)

The air-conditioning system control device 41 performs the heat-load change permissible range estimating process.

(Step S22)

The air-conditioning system control device 41 performs the optimum heat load computing process.

(Step S23)

The air-conditioning system control device 41 performs the optimum control command computing process. It is assumed that the result of the optimum control command computing process is determined before processing of step S36 described later is performed. In the case where the result of the optimum control command computing process is not determined, the processing of step S36 described later may enter a standby mode, and the processing of step S36 described later may be performed when the result of the optimum control command computing process is determined.

(Step S24)

The air-conditioning system control device 41 determines whether the last time section interval is reached. When the last time section interval is reached, the air-conditioning system control device 41 ends the air-conditioning apparatus control command determining process, and the process proceeds to step S36. On the other hand, when the last time section interval is not reached, the process performed by the air-conditioning system control device 41 returns to step S21.

(Air-Conditioning System Control Process)
(Control Command Determining Input Data Preparation Process)
(Step S31)

The air-conditioning system control device 41 determines whether a heat load estimation obtaining cycle is reached. When the heat load estimation obtaining cycle is reached, the process performed by the air-conditioning system control device 41 proceeds to step S32. On the other hand, when the heat load estimation obtaining cycle is not reached, the process performed by the air-conditioning system control device 41 returns to step S31.

(Step S32)

The air-conditioning system control device 41 obtains the heat load estimation 53.

(Step S33)

The air-conditioning system control device 41 obtains the air-conditioning apparatus data.

(Step S34)

The air-conditioning system control device 41 stores the heat load estimation 53, the air-conditioning apparatus data, the air-conditioning apparatus performance characteristic 51, and the building component physical property value 52.

(Optimum Control Command Creating Process)
(Step S35)

The air-conditioning system control device 41 determines a control command given to the air-conditioning apparatus 21. Specifically, the air-conditioning system control device 41 performs processing of step S21 to step S23 described above to determine a control command given to the air-conditioning apparatus 21.

(Step S36)

The air-conditioning system control device 41 stores the control command given to the air-conditioning apparatus 21.

(Control Command Process)
(Step S37)

The air-conditioning system control device 41 determines whether the control command transmission cycle is reached. When the control command transmission cycle is reached, the process performed by the air-conditioning system control device 41 proceeds to step S38. On the other hand, when the control command transmission cycle is not reached, the process performed by the air-conditioning system control device 41 returns to step S37.

(Step S38)

The air-conditioning system control device 41 transmits the control command to the air-conditioning apparatus 21 and ends the process.

Advantageous Effects

With the configuration described above, the air-conditioning system control device 41 can control the air-conditioning apparatus 21 so that the evaluation index is maximized or minimized, that is, the evaluation index satisfies the preset condition while the constraint is satisfied, by determining a control command given to the air-conditioning apparatus 21. Thus, the air-conditioning system control device 41 can implement energy saving while a change in the room temperature is controlled to be within a predetermined range.

As described above, in Embodiment 1, the air-conditioning system control device 41 is configured to control one or a plurality of air-conditioning apparatus 21 installed in a building, and includes the air-conditioning apparatus data obtaining unit 64 configured to obtain operation data of the one or plurality of air-conditioning apparatus 21, the heat load estimation obtaining unit 62 configured to obtain the heat load estimation 53 for the building, and the air-conditioning apparatus control command determining unit 63 configured to determine an air-conditioning apparatus control command so that a preset evaluation index satisfies a preset condition in a preset control-target period under a preset constraint. The air-conditioning apparatus control command determining unit 63 is configured to include time sections set therein, to divide the control-target period into a plurality of time periods by one or a plurality of preset division intervals. The air-conditioning apparatus control command determining unit 63 is further configured to determine a room-temperature change permissible range. A room temperature included in the operation data satisfies the constraint within the room-temperature change permissible range. The air-conditioning apparatus control command determining unit 63 is still further configured to determine a heat-load change permissible range, based on the room temperature included in the operation data, the room-temperature change permissible range, the heat load estimation 53, and a heat load to be processed by the one air-conditioning apparatus 21 or a heat load to be processed by each of the plurality of air-conditioning apparatus 21, and is configured to determine, for each of the plurality of time sections, as the air-conditioning apparatus control command, an operation frequency and start-stop of the one or plurality of air-conditioning apparatus 21, based on the heat-load change permissible range and an operation efficiency of the one air-conditioning apparatus 21 or an operation efficiency of each of the plurality of air-conditioning apparatus 21.

With the configuration described above, the air-conditioning system control device 41 can increase the operation efficiency of the air-conditioning apparatus 21 while controlling a change in the room temperature within a predetermined range when the air-conditioning apparatus 21 is in operation. Thus, the air-conditioning system control device 41 can surely perform energy-saving operation while keeping the air-conditioned space in a comfortable state.

In addition, with the configuration described above, the air-conditioning apparatus 21 operates so that the evaluation index satisfies the preset condition under the constraint. Thus, energy saving can be achieved.

In addition, in Embodiment 1, the air-conditioning apparatus control command determining unit 63 includes the heat-load change permissible range estimating unit 71 configured to determine the heat-load change permissible range, based on a measured room temperature, a preset upper-limit room-temperature set value serving as the constraint, a preset lower-limit room-temperature set value serving as the constraint, the building component physical property value 52 indicating a heat-insulating property of the building and a heat-storage property of the building, and the heat load estimation 53.

With the configuration described above, an air-conditioning apparatus control command can be determined while keeping a change in the room temperature within the room-temperature permissible range.

In addition, in Embodiment 1, the air-conditioning apparatus control command determining unit 63 includes the optimum heat load computing unit 72 configured to determine an optimum heat load of the one air-conditioning apparatus 21 or an optimum heat load of each of the plurality of air-conditioning apparatus 21, based on the heat-load change permissible range and the air-conditioning apparatus performance characteristic 51 related to the operation efficiency of the one air-conditioning apparatus 21 or the operation efficiencies of the plurality of air-conditioning apparatus 21, so that the evaluation index satisfies the preset condition in the control-target period under the constraint.

With the configuration described above, the operation efficiency of the air-conditioning apparatus 21 can be increased while a frequent change in the room temperature is controlled.

In addition, in Embodiment 1, the air-conditioning apparatus control command determining unit 63 is configured to determine an operation frequency and start-stop of the one or plurality of air-conditioning apparatus 21 that are necessary to process the optimum heat load, based on the optimum heat load and the air-conditioning apparatus performance characteristic 51.

With the configuration described above, a control command allowing the air-conditioning apparatus 21 to process the optimum heat load can be determined.

In addition, in Embodiment 1, the air-conditioning apparatus control command determining unit 63 is configured to determine an operation mode of the one air-conditioning apparatus 21 or an operation mode of each of the plurality of air-conditioning apparatus 21, based on the optimum heat load.

With the configuration descried above, the operation mode can be automatically changed depending on the heat load without requiring the user to change the operation mode.

As described above, the air-conditioning system control device 41 is especially capable of surely performing energy-saving operation while keeping the air-conditioned space in a comfortable state.

Embodiment 2

(Variations of Evaluation Index and Constraint)

Differences from Embodiment 1 are the evaluation index and the constraint. The evaluation index will be described first below, and then the constraint will be described.
(Variations of Evaluation Index)
(Functional Configuration Related to Added Evaluation Index)

Figure 12:
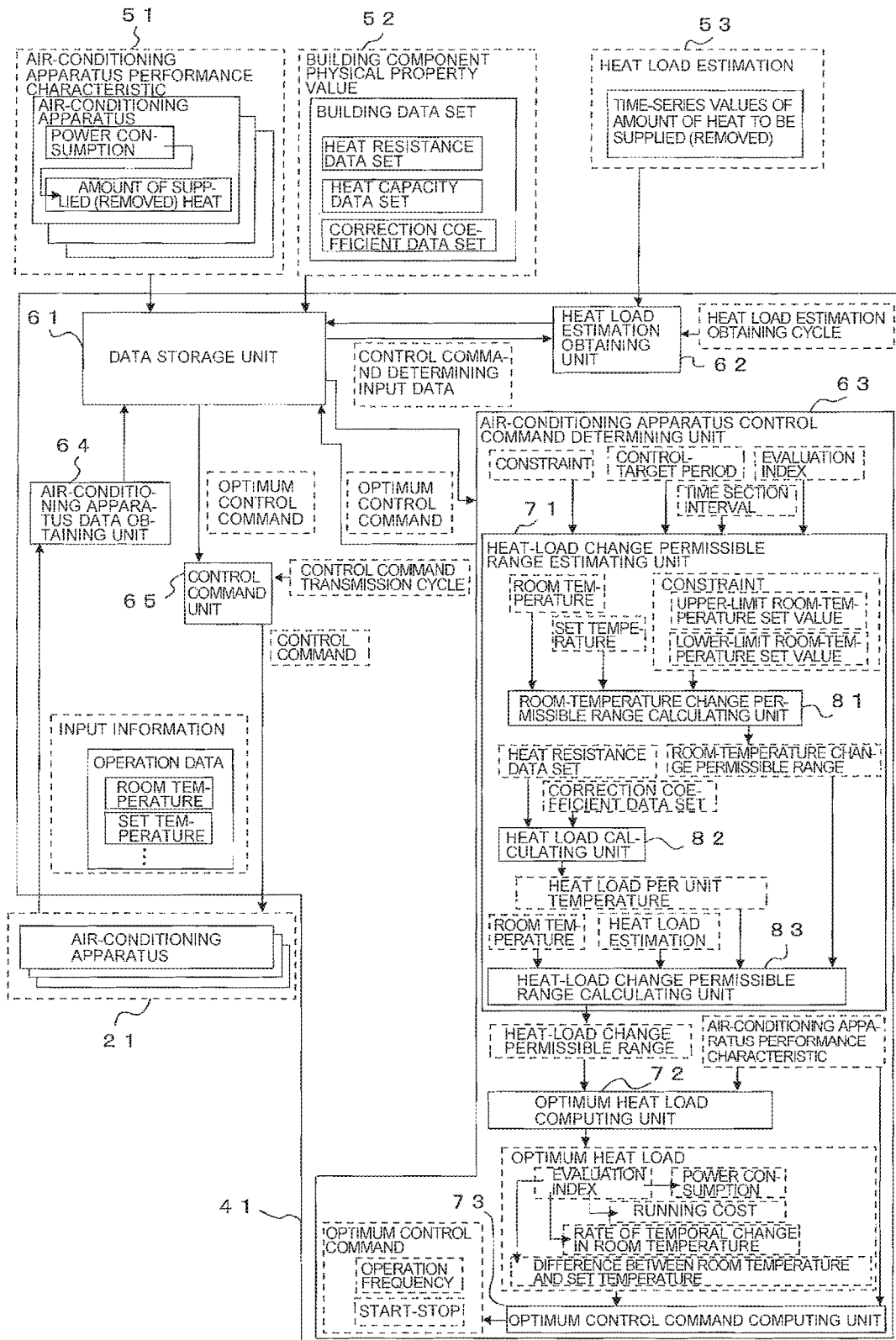
FIG. 12 is a diagram illustrating an example of evaluation indices in a detailed functional configuration of the air-conditioning system control device 41 in Embodiment 2 of the present invention.

In Embodiment 1, the power consumption is adopted as the evaluation index; however, a running cost may be adopted as the evaluation index. FIG. 12 is a diagram illustrating an example of the evaluation index in a detailed functional configuration of the air-conditioning system control device 41 in Embodiment 2 of the present invention. As illustrated in FIG. 12, a running cost is taken into account as the evaluation index when the optimum heat load is determined. At this time, power charges for respective time slots or the like may be set when needed.

Further, to make the evaluation index in which the comfortableness is taken into account, an evaluation index G expressed by Equation (7) may be set in which a difference between the room temperature and the set temperature and a rate of temporal change in the room temperature are used in combination with the power consumption and the running cost.

[Math. 7]

$$G = \alpha_1 \times G_1 + \alpha_2 \times G_2 + \alpha_3 \times G_3 + \alpha_4 \times G_4 \quad (7)$$

Here, $G_1$ denotes a power consumption of the air-conditioning apparatus 21 over the entire plan-target period, $G_2$ denotes a running cost of the air-conditioning apparatus 21 over the entire plan-target period, $G_3$ denotes a mean-square value of a difference between the room temperature and the set temperature, $G_4$ denotes a mean-square value of a rate of temporal change in the room temperature, and $\alpha_1$ to $\alpha_4$ are weight coefficients. As for $G_3$ and $G_4$, the mean-square values are not necessarily incorporated into the evaluation index. For example, $G_3$ may be an evaluation index in which the maximum value of absolute values of the difference is taken into account. In addition, $G_4$ may be an evaluation index in which the maximum value of absolute values of the rate of temporal change is taken into account.
(Advantageous Effects Related to Added Evaluation Index)

With the configuration described above, the evaluation index not only minimizes the power consumption and the running cost but also takes the comfortableness into account. Thus, an optimum control command given to the air-conditioning apparatus 21 can be determining by taking into account a balance between energy saving and comfortableness.
(Variations of Constraint)
(Case where Constraint for Rate of Temporal Change in Room Temperature is Added)
(Functional Configuration Related to Constraint for Rate of Temporal Change in Room Temperature)

In addition, in Embodiment 1, maintaining the room temperature within a range between the preset upper-limit room-temperature set value and the preset lower-limit room-temperature set value is used as the constraint related to the room temperature. In addition to this constraint, maintaining a rate of temporal change in the room temperature within a preset range of the rate of temperature change may be added to the constraint. That is, keeping the rate of temporal change in the room temperature under an upper-limit rate of temporal change in the room temperature may be used as the constraint.

Figure 13:
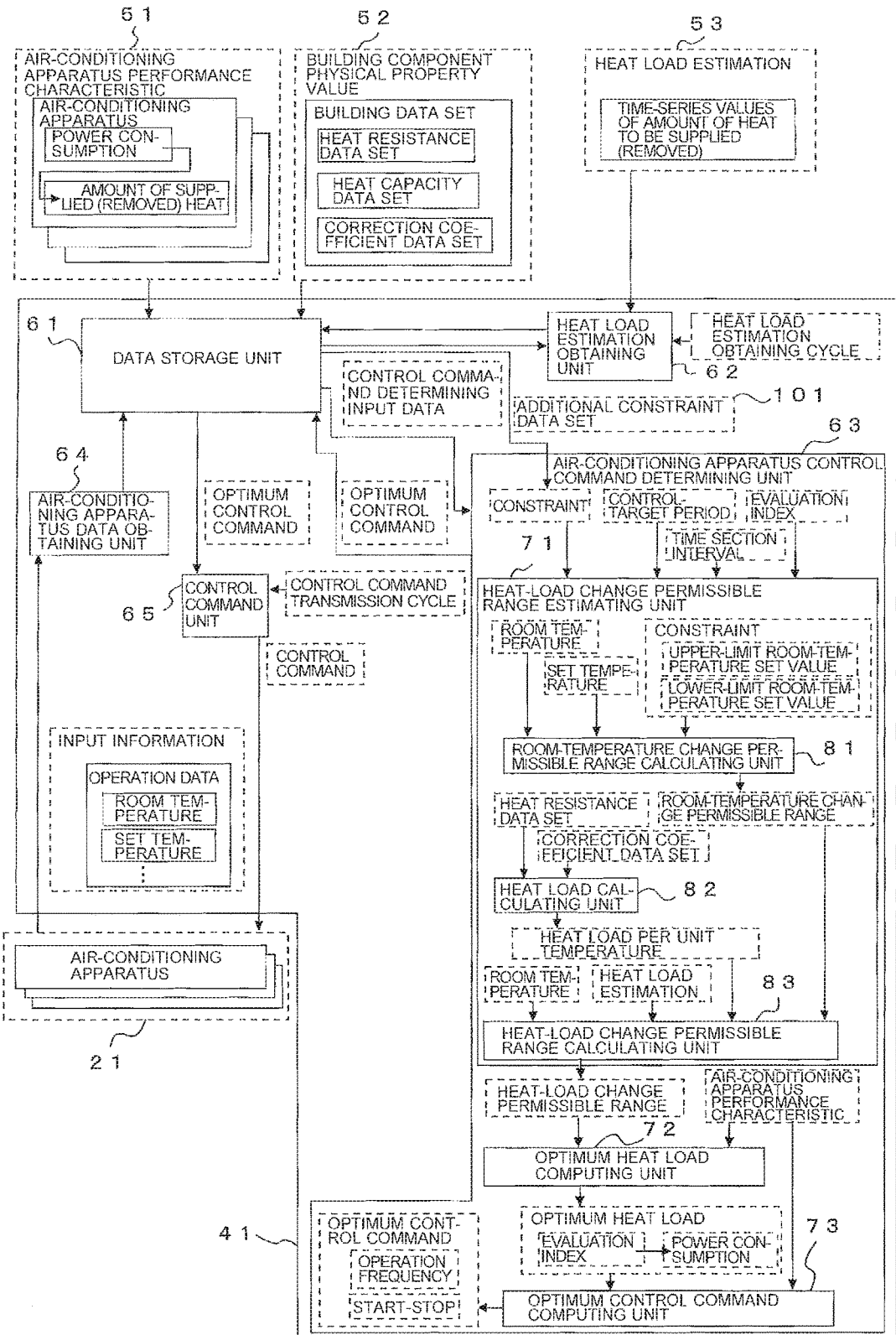
FIG. 13 is a diagram illustrating an example in which an additional constraint data set 101 is added to a constraint in the detailed functional configuration of the air-conditioning system control device 41 in Embodiment 2 of the present invention.

FIG. 13 is a diagram illustrating an example in which an additional constraint data set 101 is added to the constraint in the detailed functional configuration of the air-conditioning system control device 41 in Embodiment 2 of the present invention. As illustrated in FIG. 13, the additional constraint data set 101 is added to the constraint. The additional constraint data set 101 is, for example, a condition that the rate of temporal change in the room temperature does not exceed the upper-limit rate of temporal change in the room temperature. For example, a constraint such as 0.2 [degrees C./5 minutes or less] is set for the rate of temporal change in the room temperature.
(Advantageous Effects Related to Constraint for Rate of Temporal Change in Room Temperature)

As a result, the air-conditioning system control device 41 can avoid control of the air-conditioning apparatus 21 that involves an abrupt temperature change, further improving the comfortableness.
(Case where Constraint for Power Consumption of Air-Conditioning Apparatus 21 is Added)
(Functional Configuration Related to Constraint for Power Consumption)

In addition, the upper-limit power consumption may be added to the constraint concerning the upper limit, by adding a condition that the power consumption of the air-conditioning apparatus 21 is maintained to be equal to or lower than a preset upper-limit power consumption to the additional constraint data set 101. For example, the air-conditioning system control device 41 may have a constraint of 10 [kW] or less for the power consumption. That is, the power consumption may be constrained to be 10 [kW] or less.
(Advantageous Effects Related to Constraint for Power Consumption)

As a result, the air-conditioning system control device 41 can control the peak power and the contract power, and thus can reduce the power charge of the air-conditioning of the user.
(Case where Constraint for Number of Start-Stops of Air-Conditioning Apparatus 21 is Added)
(Functional Configuration Related to Constraint for Number of Start-Stops)

In addition, an upper-limit of a number of start-stops may be added to the constraint concerning the upper limit, by adding a condition that the number of start-stops of the air-conditioning apparatus 21 is maintained to be equal to or less than a preset upper-limit stop-start count to the additional constraint data set 101. For example, the number of times of start-stop is constrained as a result of the air-conditioning system control device 41 adding an upper-limit of a number of start-stops of once per hour or less to the additional constraint data set 101.
(Advantageous Effect Related to Constraint for Number of Start-Stops)

As a result, the air-conditioning system control device 41 can implement energy-saving operation not to reduce the life of devices, such as a compressor, included in the air-conditioning apparatus 21.

(Advantageous Effects Related to Evaluation Index and Constraint)

As described above, the air-conditioning system control device 41 can determine an optimum control command, by taking into account the comfortableness, a controlled peak power, and the life of devices included in the air-conditioning apparatus 21 based on various points of view.

As described above, in Embodiment 2, the constraint includes any one of or a combination of two or more of a first condition that the room temperature is maintained between the upper-limit room-temperature set value and the lower-limit room-temperature set value, a second condition that a rate of temporal change in the room temperature is maintained in a preset rate of temporal change in room temperature, a third condition that a power consumption of the air-conditioning apparatus 21 is maintained within a preset range of power consumption, and a fourth condition that a number of start-stops of the air-conditioning apparatus 21 is maintained up to a predetermined number of times.

With the configuration described above, energy saving can be achieved while not only a change in the room temperature is controlled to be within a permissible range of the change in the room temperature but also a frequent change in the room temperature, the peak power, and the number of start-stops of the air-conditioning apparatus 21 are controlled to be within permissible ranges.

In addition, in Embodiment 2, the evaluation index includes any one of or a combination of two or more of a power consumption of the one air-conditioning apparatus 21 or a power consumption of each of the plurality of air-conditioning apparatus 21 in the control-target period, a running cost of the one air-conditioning apparatus 21 or a running cost of each of the plurality of air-conditioning apparatus 21 in the control-target period, an air-conditioning apparatus efficiency determined from the air-conditioning apparatus performance characteristic 51, a difference between the room temperature and a set temperature, and a rate of temporal change in the room temperature.

With the configuration described above, the evaluation index that not only minimizes the power consumption and the running cost but also takes the comfortableness into account is used, and thus operation of the air-conditioning apparatus 21 can be implemented by taking into account a balance between energy saving and comfortableness.

Embodiment 3

(Functional Configuration Variation of Air-Conditioning System Control Device 41)

Figure 14:
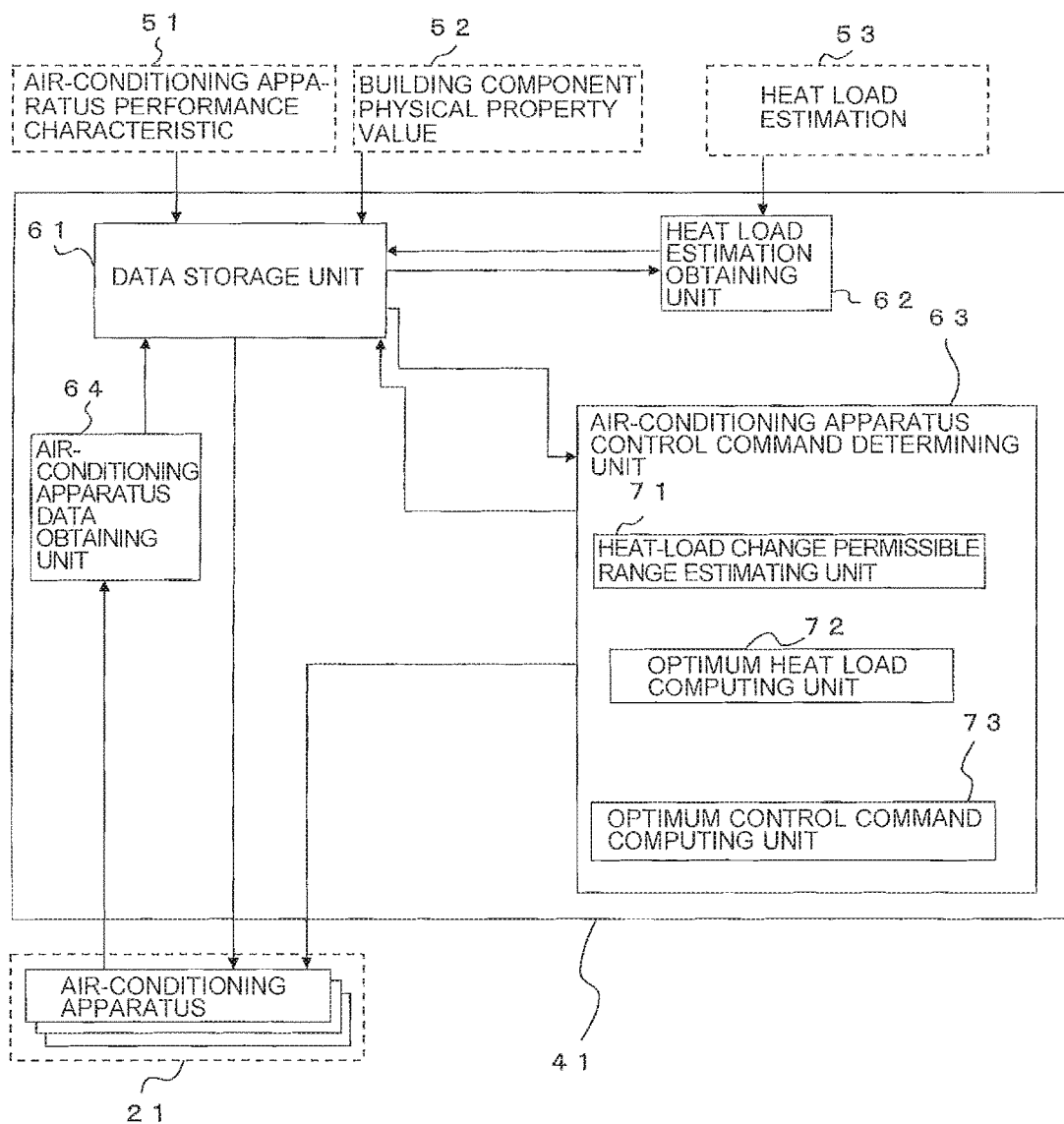
FIG. 14 is a diagram illustrating an example of a functional configuration of the air-conditioning system control device 41 in Embodiment 3 of the present invention.
Figure 15:
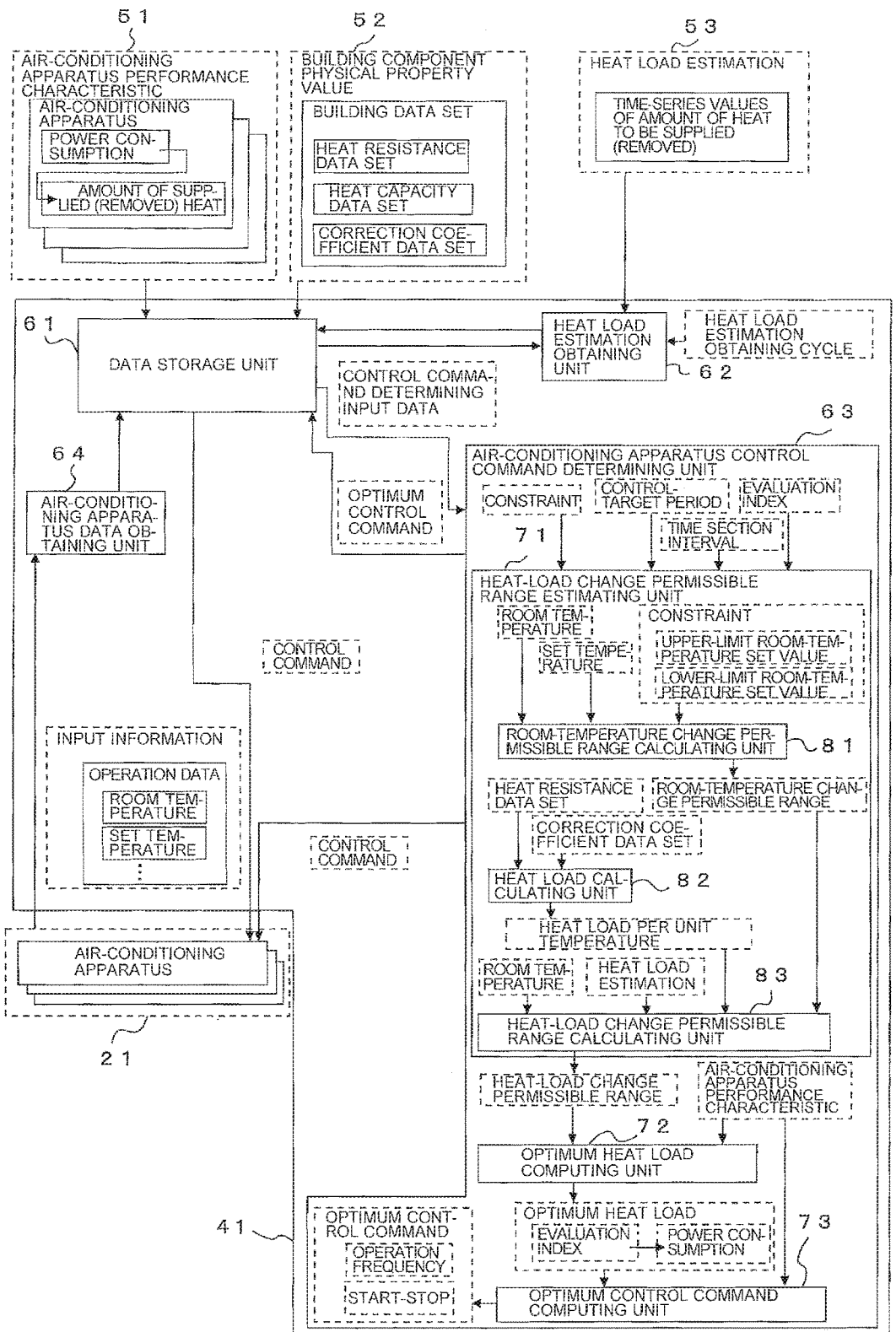
FIG. 15 is a diagram illustrating an example of a detailed functional configuration of the air-conditioning system control device 41 in Embodiment 3 of the present invention.

A difference from Embodiment 1 and Embodiment 2 is that the control command unit 65 is not provided. FIG. 14 is a diagram illustrating an example of a functional configuration of the air-conditioning system control device 41 in Embodiment 3 of the present invention. FIG. 15 is a diagram illustrating an example of a detailed functional configuration of the air-conditioning system control device 41 in Embodiment 3 of the present invention.

As illustrated in FIGS. 14 and 15, the air-conditioning system control device 41 in Embodiment 3 does not include the control command unit 65. In the case where a control command is transmitted from the data storage unit 61 to the air-conditioning apparatus 21, for example, a processor not illustrated or an integral control unit that is not illustrated and that integrally controls the air-conditioning system control device 41 may allow the data storage unit 61 to transmit the control command to the air-conditioning apparatus 21. In addition, when the data storage unit 61 includes a data control unit not illustrated, the data control unit not illustrated may transmit the control command from the data storage unit 61 to the air-conditioning apparatus 21.

In addition, in the case where a control command is transmitted from the air-conditioning apparatus control command determining unit 63 to the air-conditioning apparatus 21, the air-conditioning apparatus control command determining unit 63 may determine a control command and then transmit the determined control command to the air-conditioning apparatus 21.

In any case, it is assumed that an identifier specifying the air-conditioning apparatus 21, for example, an address of the air-conditioning apparatus 21, is preset in the data storage unit 61 or the air-conditioning apparatus control command determining unit 63. Note that in the case where the address of the air-conditioning apparatus 21 is not preset in the data storage unit 61 or the air-conditioning apparatus control command determining unit 63, the address may be set in the data storage unit 61 or the air-conditioning apparatus control command determining unit 63 before the control command is transmitted.

As described above, the air-conditioning system control device 41 can transmit a control command to the air-conditioning apparatus 21 even when the control command unit 65 is not included.

Embodiment 4

(Functional Configuration Variation of Air-Conditioning System Control Device 41)

A difference from Embodiment 1 and Embodiment 2 is that the control command unit 65 is not provided. A difference from Embodiment 3 is the evaluation index and the constraint, which are the same as those of Embodiment 2.

Figure 16:
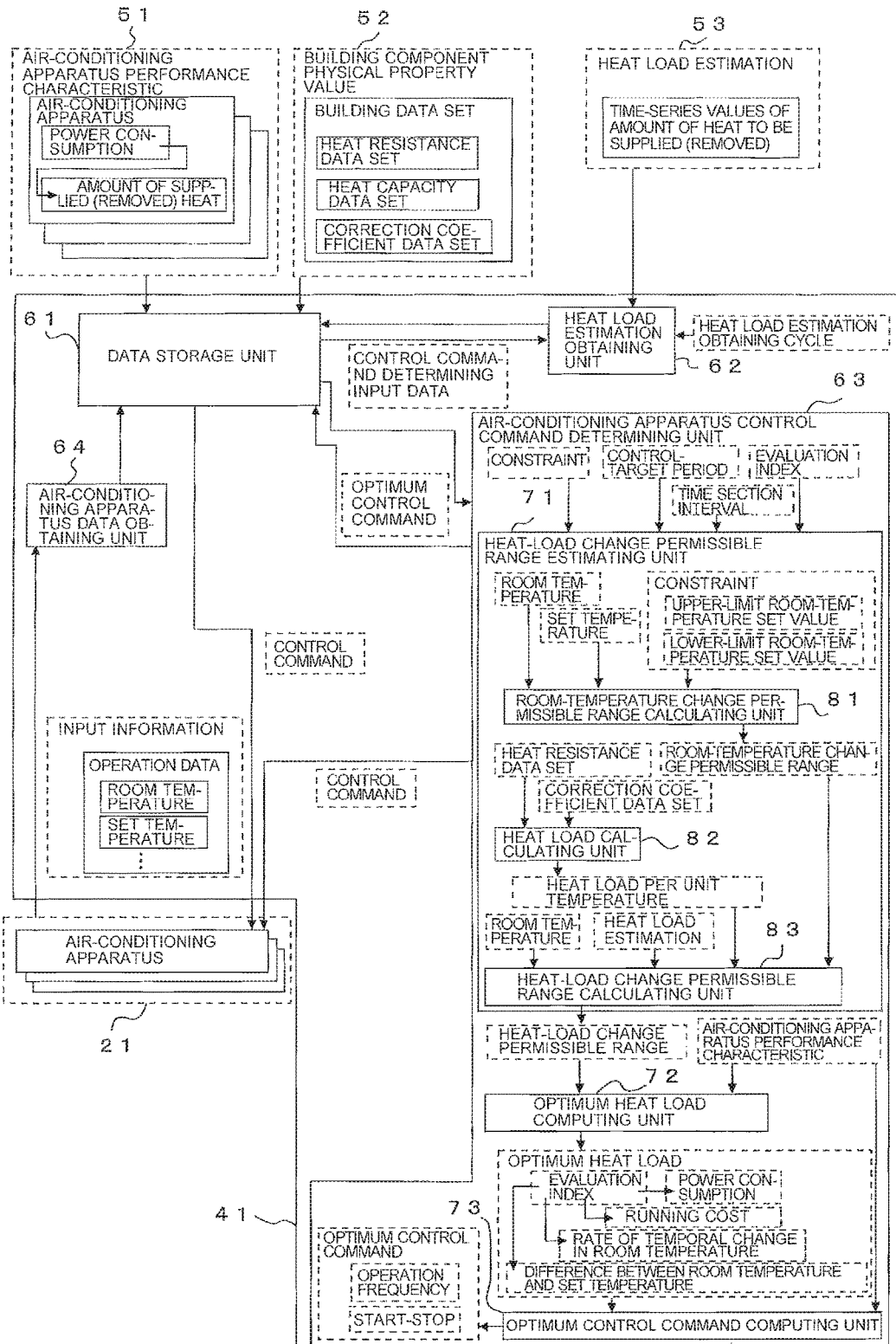
FIG. 16 is a diagram illustrating an example of evaluation indices in a detailed functional configuration of the air-conditioning system control device 41 in Embodiment 4 of the present invention.
Figure 17:
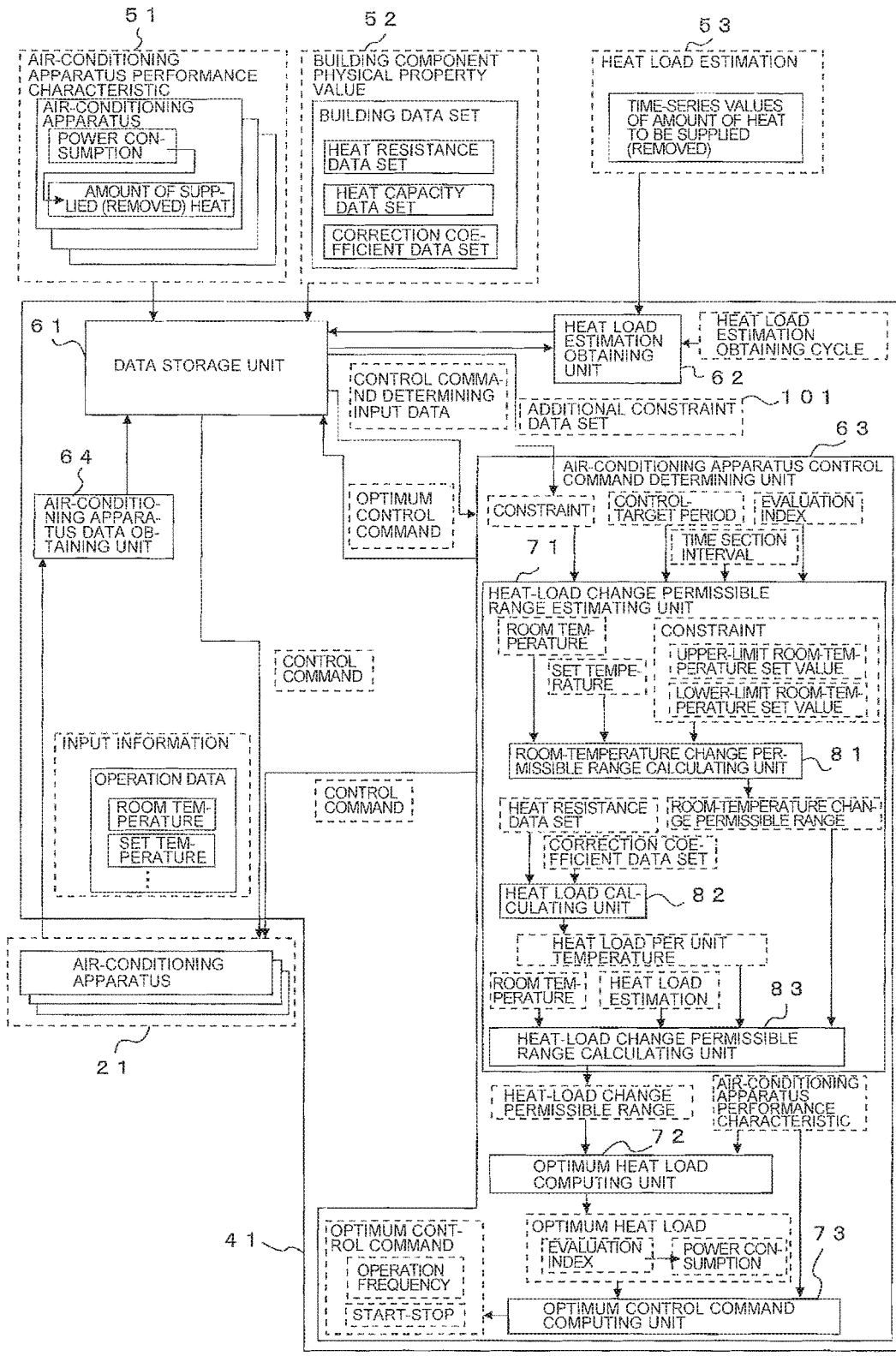
FIG. 17 is a diagram illustrating an example in which the additional constraint data set 101 is added to the constraint in the detailed functional configuration of the air-conditioning system control device 41 in Embodiment 4 of the present invention.

FIG. 16 is a diagram illustrating an example of evaluation indices in a detailed functional configuration of the air-conditioning system control device 41 in Embodiment 4 of the present invention. FIG. 17 is a diagram illustrating an example in which the additional constraint data set 101 is added to the constraint in the detailed functional configuration of the air-conditioning system control device 41 in Embodiment 4 of the present invention.

As illustrated in FIGS. 16 and 17, the air-conditioning system control device 41 in Embodiment 4 does not include the control command unit 65. In the case where a control command is transmitted from the data storage unit 61 to the air-conditioning apparatus 21, for example, a processor not illustrated or an integral control unit that is not illustrated and that integrally controls the air-conditioning system control device 41 may allow the data storage unit 61 to transmit the control command to the air-conditioning apparatus 21. In addition, when the data storage unit 61 includes a data control unit not illustrated, the data control unit not illustrated may transmit the control command from the data storage unit 61 to the air-conditioning apparatus 21.

In addition, in the case where a control command is transmitted from the air-conditioning apparatus control command determining unit 63 to the air-conditioning apparatus 21, the air-conditioning apparatus control command determining unit 63 may determine a control command and then transmit the determined control command to the air-conditioning apparatus 21.

In any case, it is assumed that an identifier specifying the air-conditioning apparatus 21, for example, an address of the air-conditioning apparatus 21, is preset in the data storage unit 61 or the air-conditioning apparatus control command determining unit 63. Note that in the case where the address of the air-conditioning apparatus 21 is not preset in the data storage unit 61 or the air-conditioning apparatus control command determining unit 63, the address may be set in the data storage unit 61 or the air-conditioning apparatus control command determining unit 63 before the control command is transmitted.

As described above, the air-conditioning system control device 41 can transmit a control command to the air-conditioning apparatus 21 even when the control command unit 65 is included.

REFERENCE SIGNS LIST 1 air-conditioning system 11 air-conditioning controller 12 air-conditioning equipment 13 air-conditioning network 14 device connection controller 15 air-conditioning control computer 16 general-purpose network 19 sensor 21 air-conditioning apparatus 21a outdoor unit 21b indoor unit 22 ventilation equipment 23 total heat exchanger 24 humidifier 25 dehumidifier 26 heater 27 outside air-conditioning apparatus 41 air-conditioning system control device 51 air-conditioning apparatus performance characteristic 52 building component physical property value 53 heat load estimation 61 data storage unit 62 heat load estimation obtaining unit 63 air-conditioning apparatus control command determining unit 64 air-conditioning apparatus data obtaining unit 65 control command unit 71 heat-load change permissible range estimating unit 72 optimum heat load computing unit 73 optimum control command computing unit 81 room-temperature change permissible range calculating unit 82 heat load calculating unit 83 heat-load change permissible range calculating unit 101 additional constraint data set

The invention claimed is:

1. An air-conditioning system control device configured to control one or a plurality of air-conditioning apparatus installed in a building, comprising:
    a processor configured to:
        obtain operation data of the one or plurality of air-conditioning apparatus,
        obtain a heat load estimation for the building,
        determine an air-conditioning apparatus control command so that a preset evaluation index satisfies a preset condition in a preset control-target period under a preset constraint,
        include time sections set therein to divide the control-target period into a plurality of time periods by one or a plurality of preset division intervals,
        determine a room-temperature change permissible range, a room temperature included in the operation data satisfying the constraint within the room-temperature change permissible range,
        determine a heat-load change permissible range, which is a permissible range of a change in the heat load to be processed, based on the room temperature included in the operation data, an upper-limit room-temperature set value and a lower-limit room-temperature set value on the room-temperature change permissible range, a building component physical property value indicating a heat-insulating property of the building and a heat-storage property of the building, the heat load estimation, and a heat load to be processed by the one air-conditioning apparatus or a heat load to be processed by each of the plurality of air-conditioning apparatus,
        determine, for each of the plurality of time sections, as the air-conditioning apparatus control command, an operation frequency and start-stop of the one or plurality of air-conditioning apparatus based on the heat-load change permissible range and an operation efficiency of the one air-conditioning apparatus or an operation efficiency of each of the plurality of air-conditioning apparatus, and
        control the one or the plurality of air-conditioning apparatus based upon the air-conditioning apparatus control command to maintain the heat-load within the heat-load change permissible range.

2. The air-conditioning system control device of claim 1, wherein the processor is configured to determine an optimum heat load of the one air-conditioning apparatus or an optimum heat load of each of the plurality of air-conditioning apparatus, based on the heat-load change permissible range and an air-conditioning apparatus performance characteristic related to the operation efficiency of the one air-conditioning apparatus or the operation efficiencies of the plurality of air-conditioning apparatus, so that the evaluation index satisfies the preset condition in the control-target period under the constraint.

3. The air-conditioning system control device of claim 2, wherein the processor is configured to determine an operation frequency and start-stop of the one or plurality of air-conditioning apparatus based on the optimum heat load and the air-conditioning apparatus performance characteristic, the operation frequency and the start-stop being necessary to process the optimum heat load.

4. The air-conditioning system control device of claim 1, wherein the constraint includes any one of or a combination of two or more of a first condition that the room temperature is maintained between the upper-limit room-temperature set value and the lower-limit room-temperature set value, a second condition that a rate of temporal change in the room temperature is maintained in a preset rate of temporal change in room temperature, a third condition that a power consumption of the air-conditioning apparatus is maintained within a preset range of power consumption, and a fourth condition that a number of start-stops of the air-conditioning apparatus is maintained up to a predetermined number of times.

5. The air-conditioning system control device of claim 2, wherein the evaluation index includes any one of or a combination of two or more of a power consumption of the one air-conditioning apparatus or a power consumption of each of the plurality of air-conditioning apparatus in the control-target period, a running cost of the one air-conditioning apparatus or a running cost of each of the plurality of air-conditioning apparatus in the control-target period, an air-conditioning apparatus efficiency determined from the air-conditioning apparatus performance characteristic, a difference between the room temperature and a set temperature, and a rate of temporal change in the room temperature.

6. The air-conditioning system control device of claim 2, wherein the processor is configured to determine an operation mode of the one air-conditioning apparatus or an operation mode of each of the plurality of air-conditioning apparatus, based on the optimum heat load.

7. An air-conditioning system control method for controlling one or a plurality of air-conditioning apparatus installed in a building, comprising:
    obtaining operation data of the one or plurality of air-conditioning apparatus, obtaining a heat load estimation for the building, determining an air-conditioning apparatus control command so that a preset evaluation index satisfies a preset condition in a preset control-target period under a preset constraint, and controlling the one or the plurality of air-conditioning apparatus based upon the air-conditioning apparatus control command to maintain the heat-load within the heat-load change permissible range, wherein in the determining the air-conditioning apparatus control command, time sections to divide the control-target period into a plurality of time periods by one or a plurality of preset division intervals are set, a room-temperature change permissible range is determined, a room temperature included in the operation data satisfying the constraint within the room-temperature change permissible range, a heat-load change permissible range that is a permissible range of a change in the heat load to be processed is determined based on the room temperature included in the operation data, an upper-limit room-temperature set value and a lower-limit room-temperature set value on the room-temperature change permissible range, a building component physical property value indicating a heat-insulating property of the building and a heat-storage property of the building, the heat load estimation, and a heat load to be processed by the one air-conditioning apparatus or a heat load to be processed by each of the plurality of air-conditioning apparatus, and for each of the plurality of time sections, as the air-conditioning apparatus control command, an operation frequency and start-stop of the one or plurality of air-conditioning apparatus is determined based on the heat-load change permissible range and an operation efficiency of the one air-conditioning apparatus or operation efficiencies of the plurality of air-conditioning apparatus.

8. The air-conditioning system control method of claim 7, wherein, in the determining the air-conditioning apparatus control command, an optimum heat load of the one air-conditioning apparatus or optimum heat loads of the plurality of air-conditioning apparatus is determined, based on the heat-load change permissible range and an air-conditioning apparatus performance characteristic related to the operation efficiency of the one air-conditioning apparatus or the operation efficiencies of the plurality of air-conditioning apparatus, so that the evaluation index satisfies the preset condition in the control-target period under the constraint.

9. The air-conditioning system control method of claim 8, wherein, in the determining the air-conditioning apparatus control command, an operation frequency and start-stop of the one or plurality of air-conditioning apparatus is determined based on the optimum heat load and the air-conditioning apparatus performance characteristic, the operation frequency and the start-stop being necessary to process the optimum heat load.

* * * * *